US010582740B2

(12) United States Patent
Cook et al.

(10) Patent No.: US 10,582,740 B2
(45) Date of Patent: *Mar. 10, 2020

(54) METHOD OF CUSTOMIZING STABILITY IN ARTICLES OF FOOTWEAR

(71) Applicant: NIKE, Inc., Beaverton, OR (US)

(72) Inventors: Christopher S. Cook, Portland, OR (US); Shane S. Kohatsu, Portland, OR (US); Bret Schoolmeester, Banks, OR (US); Daniel T. Rowe, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 817 days.

This patent is subject to a terminal disclaimer.

(21) Appl. No.: 15/055,086

(22) Filed: Feb. 26, 2016

(65) Prior Publication Data

US 2017/0245588 A1 Aug. 31, 2017

(51) Int. Cl.
G06Q 30/00 (2012.01)
A43B 13/18 (2006.01)
(Continued)

(52) U.S. Cl.
CPC ............ A43B 13/186 (2013.01); A43B 7/144 (2013.01); A43B 13/026 (2013.01); A43B 13/04 (2013.01);
(Continued)

(58) Field of Classification Search
CPC ..... A43B 13/186; A43B 7/144; A43B 13/026; A43B 13/04; A43B 13/125; A43B 13/188;
(Continued)

(56) References Cited

U.S. PATENT DOCUMENTS 4,494,322 A * 1/1985 Klagmann ............ A43B 13/186 36/28
5,042,175 A * 8/1991 Ronen .................. A43B 13/182 36/15
(Continued)

FOREIGN PATENT DOCUMENTS

WO 2004084667 A2 10/2004

OTHER PUBLICATIONS

Luximon, Ameersing, Ravindra S. Goonetilleke, and Kwok-L. Tsui. "A fit metric for footwear customization." Proceedings of the 2001 World Congress on Mass Customization and Personalization. 2001. (Year: 2001).*
(Continued)

Primary Examiner — Matthew E Zimmerman
(74) Attorney, Agent, or Firm — Banner & Witcoff, Ltd.

(57) ABSTRACT

The disclosed method provides a way to manufacture a style of an article of footwear in bulk, while providing customization for heel stability for individual customers. Moreover, the disclosed method provides a way to customize articles of footwear for a customer on an ongoing basis, such that the heel stability of the articles of footwear is refined until a tailored fit is achieved for the same customer. Generally, the method may include providing a user/customer with an article of footwear, getting evaluation information about the stability of the article of footwear from a survey (e.g., asking the user to rate the stability of the article of footwear in a smartphone app), modifying the next article of footwear provided to the user/customer according to the evaluation information, and iterating through this process to give the user an article optimized for stability.

20 Claims, 25 Drawing Sheets

(51) Int. Cl.
*A43B 7/14* (2006.01)
*G06Q 30/06* (2012.01)
*A43B 13/02* (2006.01)
*A43B 13/04* (2006.01)
*A43B 13/12* (2006.01)
*A43D 1/02* (2006.01)

(52) U.S. Cl.
CPC .......... *A43B 13/125* (2013.01); *A43B 13/181* (2013.01); *A43B 13/188* (2013.01); *A43D 1/02* (2013.01); *G06Q 30/0621* (2013.01)

(58) Field of Classification Search
CPC ....... A43B 1/02; A43B 13/181; A43B 13/141; A43B 3/26; A43D 1/02; G06Q 30/0621
See application file for complete search history.

(56) References Cited

U.S. PATENT DOCUMENTS

| | | | |
|---|---|---|---|
| 5,797,199 A | 8/1998 | Miller et al. | |
| 6,238,049 B1* | 5/2001 | Griffin | A61B 3/028 |
| | | | 351/243 |
| 6,879,945 B1* | 4/2005 | Cook | A43D 1/025 |
| | | | 264/244 |
| 6,880,266 B2* | 4/2005 | Schoenborn | A43B 7/142 |
| | | | 36/28 |
| 6,983,555 B2 | 1/2006 | Lacorazza et al. | |
| 7,992,324 B2* | 8/2011 | Lacorazza | A43B 5/00 |
| | | | 36/102 |
| 8,234,798 B2 | 8/2012 | Dibenedetto et al. | |
| 8,521,616 B2* | 8/2013 | End | G06Q 30/06 |
| | | | 705/26.63 |
| 8,732,986 B2 | 5/2014 | Miner et al. | |
| 2005/0071242 A1* | 3/2005 | Allen | G06Q 10/087 |
| | | | 705/26.5 |
| 2005/0071935 A1* | 4/2005 | Shah | A43D 1/025 |
| | | | 12/146 L |
| 2006/0129416 A1* | 6/2006 | Shum | G06Q 30/0603 |
| | | | 705/500 |
| 2007/0011173 A1* | 1/2007 | Agostino | A43D 1/02 |
| 2007/0043582 A1* | 2/2007 | Peveto | A43B 3/26 |
| | | | 705/1.1 |
| 2012/0042539 A1* | 2/2012 | Miner | A43B 13/141 |
| | | | 36/29 |
| 2013/0110666 A1* | 5/2013 | Aubrey | G06Q 30/0269 |
| | | | 705/26.5 |
| 2013/0159866 A1* | 6/2013 | Dirsa | G06Q 50/04 |
| | | | 715/738 |
| 2013/0160223 A1* | 6/2013 | Bier | A43B 3/0078 |
| | | | 12/146 B |
| 2013/0167405 A1* | 7/2013 | Forsey | A43B 7/144 |
| | | | 36/92 |
| 2014/0109440 A1 | 4/2014 | McDowell et al. | |
| 2014/0268060 A1* | 9/2014 | Lee | A61B 3/0041 |
| | | | 351/241 |
| 2015/0033579 A1 | 2/2015 | Barnes et al. | |
| 2015/0075033 A1* | 3/2015 | Cross | A43B 13/22 |
| | | | 36/103 |
| 2015/0128452 A1 | 5/2015 | Hull et al. | |
| 2015/0242929 A1* | 8/2015 | Wilkinson | G06Q 30/0631 |
| | | | 705/26.7 |
| 2017/0150764 A1* | 6/2017 | Meloni | A41H 1/10 |

OTHER PUBLICATIONS

Luximon, Ameersing, Ravindra S. Goonetilleke, and Kwok-L. Tsui. "A fit metric for footwear customization." Proceedings of the 2001 World Congress on Mass Customization and Personalization. 2001. (Year: 2001) (Year: 2001).*

Jun. 14, 2017—(WO) International Search Report and Written Opinion—App PCT/US2017/019639.

Cecilia Brennan, "Orthotic Recalls: Do you need to have your orthotics reassessed or refurbished?" http://www.sportandspinalphysio.com.au/orthotic-recalls/ XP055375489, Jul. 30, 2015.

Anonymous, "Nike Product Testing" https://web.archive.org/web/20170523133404/http://www.letsrun.com/forum/flat_read.php?thread=1141975 XP055375506, Dec. 13, 2005.

Harry Hurt III, "Sneaker Tester, No Running Required (Thankfully)" https://web.archive.org/web/20170523134106/ http://www.nytimes.com/2008/08/09/business/09pursuits.html The New York Times, Aug. 8, 2008.

* cited by examiner

METHOD OF CUSTOMIZING STABILITY IN ARTICLES OF FOOTWEAR

BACKGROUND

The present embodiments relate generally to a method of customizing an article of footwear, and, in particular, to a method of customizing an article of footwear to have a specified heel stiffness profile.

Articles of footwear generally include two primary elements: an upper and a sole member. The upper is often formed from a plurality of material elements (e.g., textiles, polymer sheet layers, foam layers, leather, and synthetic leather) that are stitched or adhesively bonded together to form a void on the interior of the footwear for comfortably and securely receiving a foot. More particularly, the upper forms a structure that extends over the instep and toe areas of the foot, along medial and lateral sides of the foot, and around a heel area of the foot. The upper may also incorporate a lacing system to adjust the fit of the footwear, as well as permitting entry and removal of the foot from the void within the upper. In addition, the upper may include a tongue that extends under the lacing system to enhance adjustability and comfort of the footwear, and the upper may incorporate a heel counter.

The sole member is secured to a lower portion of the upper so as to be positioned between the foot and the ground. In athletic footwear, for example, the sole member includes a midsole and an outsole.

Articles of footwear are usually manufactured in bulk and are sold without customization. For example, articles of footwear are typically sold with only one option for heel stiffness.

SUMMARY

In one aspect, the disclosure provides a method of customizing an article of footwear. The method may include a step of manufacturing a first article of footwear having a first sole structure with a forefoot region, a heel region opposite the forefoot region, and a midfoot region disposed between the forefoot region and the heel region. The first article of footwear may have a first heel stiffness profile. The method may include a step of providing the first article of footwear to a customer. The method may include a step of providing an evaluation system to the customer. The method may include a step of receiving a customer evaluation of heel stability of the first article of footwear. The method may include a step of manufacturing a second article of footwear having a second sole structure with a forefoot region, a heel region opposite the forefoot region, and a midfoot region disposed between the forefoot region and the heel region. The method may include a step of adjusting the second sole structure of the second article of footwear to have a second heel stiffness profile that is different from the first heel stiffness profile. The method may include a step of providing the second article of footwear to the customer.

In one aspect, the disclosure provides a method of customizing an article of footwear. The method may include a step of manufacturing a first article of footwear having a first sole structure with a forefoot region, a heel region opposite the forefoot region, and a midfoot region disposed between the forefoot region and the heel region, wherein the first article of footwear has a first heel stiffness profile. The method may include a step of providing the first article of footwear to a customer. The method may include a step of providing an evaluation system to the customer. The method may include a step of receiving a first customer evaluation of heel stability of the first article of footwear. The method may include a step of manufacturing a second article of footwear having a second sole structure with a forefoot region, a heel region opposite the forefoot region, and a midfoot region disposed between the forefoot region and the heel region. The method may include a step of using the first customer evaluation of heel stability to determine a second heel stiffness profile for the second sole structure, wherein the second heel stiffness profile is different from the first heel stiffness profile. The method may include a step of adjusting the second sole structure of the second article of footwear to have the second heel stiffness profile. The method may include a step of providing the second article of footwear to the customer.

In one aspect, the disclosure provides a method of customizing an article of footwear. The method may include a step of manufacturing a first article of footwear having a first sole structure with a forefoot region, a heel region opposite the forefoot region, and a midfoot region disposed between the forefoot region and the heel region, wherein the first article of footwear has a first heel stiffness profile. The method may include a step of providing the first article of footwear to a customer. The method may include a step of providing an evaluation system to the customer. The method may include a step of receiving a customer evaluation of heel stability of the first article of footwear. The method may include a step of manufacturing a second article of footwear having a second sole structure with a forefoot region, a heel region opposite the forefoot region, a midfoot region disposed between the forefoot region and the heel region, wherein the second sole structure has an outer surface with an upper surface, a lower surface, and a sidewall. The method may include a step of removing material from the outer surface of the second sole structure of the second article of footwear to have a second heel stiffness profile that is different from the first heel stiffness profile. The method may include a step of providing the second article of footwear to the customer.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
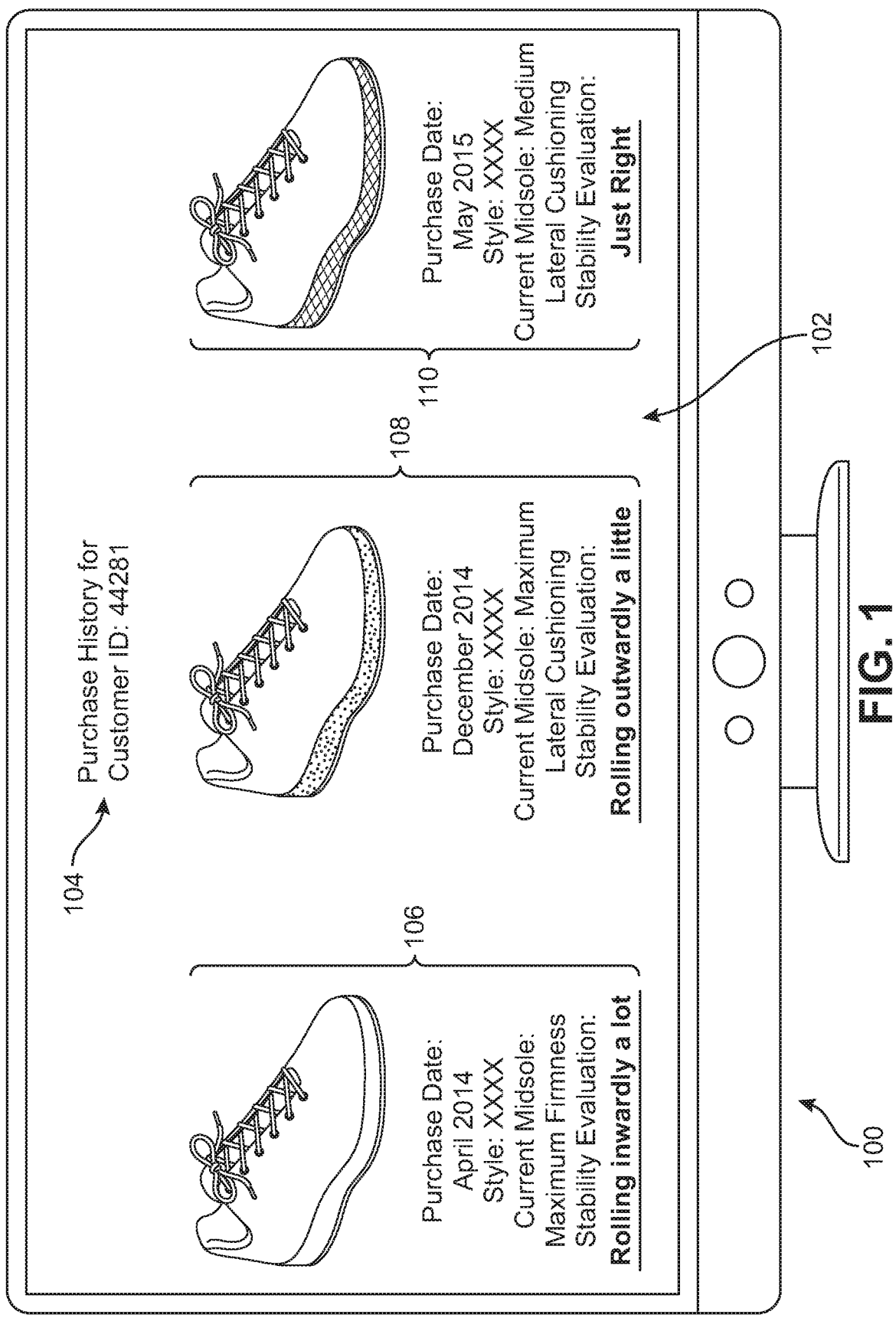
FIG. 1 shows the purchase history of a customer, according to an embodiment.

Articles of footwear are conventionally manufactured in bulk and then sold without customization. Accordingly, a single style of an article of footwear typically comes with only one option for heel stability. The disclosed method provides a way to manufacture a style of an article of footwear in bulk, while providing customization for heel stability for individual customers. Moreover, the disclosed method provides a way to customize articles of footwear for a customer on an ongoing basis, such that the heel stability of the articles of footwear is refined until a tailored fit is achieved for the same customer.

For clarity, the term "customer" may be used interchangeably with "user" herein, as the term "customer," for the purposes of this disclosure, is not limited to a person purchasing a product. A "customer" may also be a user receiving an article of footwear free of charge. Similarly, the term "purchase history," as used herein, may include certain information about the history of a user receiving one or more articles of footwear in exchange for currency or free of charge.

The disclosed method includes an iterative process of using customer feedback to customize the stability of an article of footwear. In different embodiments, the article of footwear may be any type of article of footwear including, but not limited to, a running shoe, shoe with cleats, boot, slip-on shoe, high-top shoe, low-top shoe, or bootie, as well as other types of footwear. For example, the articles of footwear shown in the drawings may be running shoes.

Figure 2:
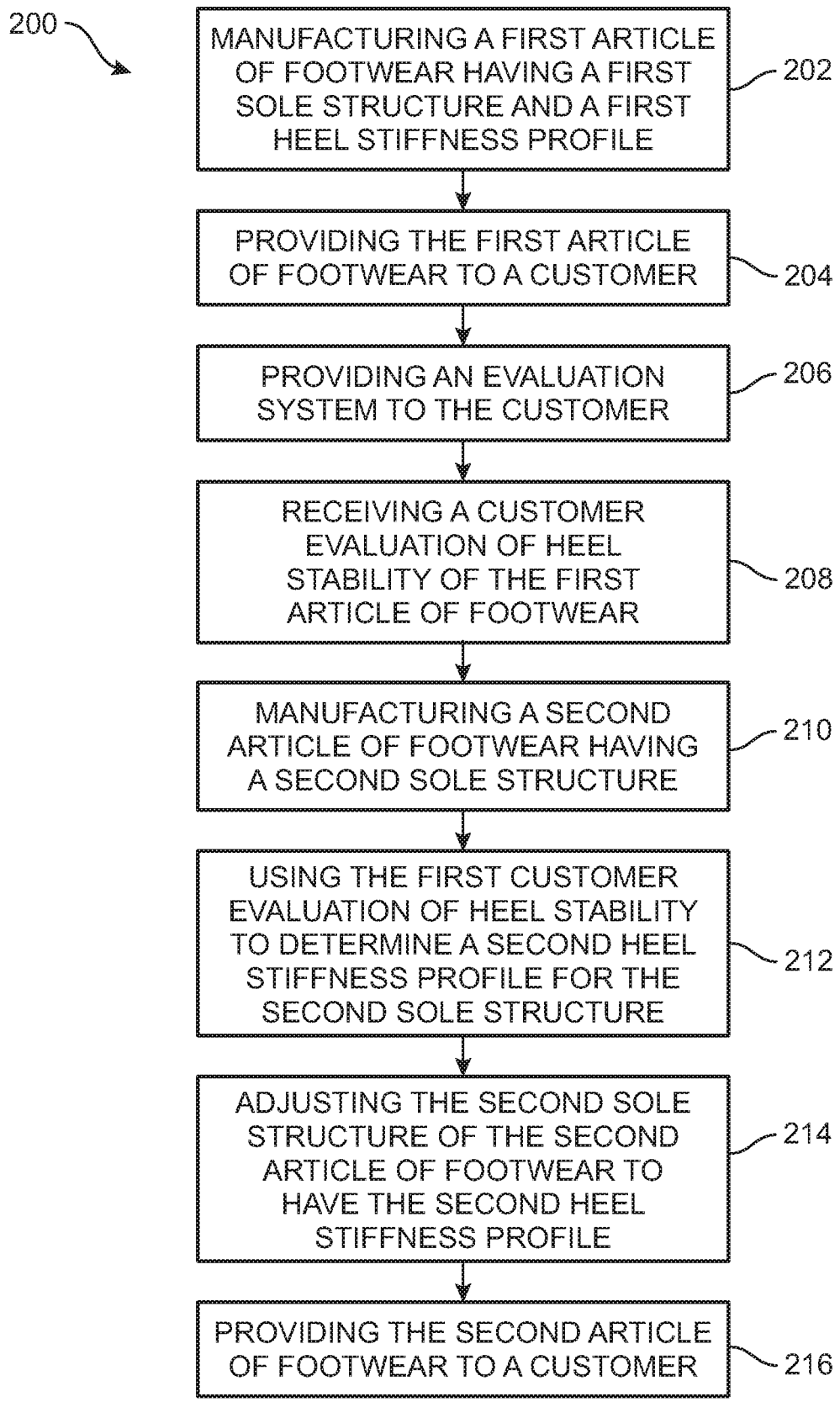
FIG. 2 shows a method of customizing an article of footwear, according to an embodiment.

FIG. 1 shows an example of a customer's purchase history that may be collected, stored, and used to customize an article of footwear. FIG. 2 illustrates a method of customizing an article of footwear, according to an embodiment. The method may also be considered a "customization cycle." Generally, the method may include providing a user/customer with an article of footwear, getting evaluation information about the stability of the article of footwear from a survey (e.g., asking the user to rate the stability of the article of footwear in a smartphone app), modifying the next article of footwear provided to the user/customer according to the evaluation information, and iterating through this process to give the user an article optimized for stability. In FIG. 2, the steps discussed may be steps taken by a manufacturer, retailer, or other party. As used herein, a manufacturer may be any party that sells or otherwise provides articles to customers and which receives feedback (directly or indirectly) about the articles. It may be understood that steps of manufacturing could take place at a factory and/or at a retail facility (a store, kiosk, etc.). In some embodiments, a manufacturer may supply the raw parts and materials for manufacturing the articles. In other embodiments, a manufacturer may be provided with some prefabricated components that are then assembled (e.g., in a permanent manner) to form a final article.

It is clear that method/customization cycle 200 is cyclical so that each step can occur multiple times over the lifetime of the customer-manufacturer (or customer-proprietor) relationship. In particular, and as discussed in further detail below, such a cycle provides for iterating customizable features in footwear until the point where a given customized feature has been deemed ideal, or close enough within some tolerance, for a user or customer. In other words, the cycle could be repeated 2, 3, 4, 5, 6, 7, 8, 9, 10, and up to N times, where N is any number. Moreover, the process repeated N times provides a user or customer with N or N+1 different pairs of footwear.

Although the embodiments discuss a method conducted by a manufacturer, in other embodiments the customization method described herein may more broadly be operated or conducted by a proprietor (or proprietors). A proprietor may include one or more factories, multiple offices, retailers and various other establishments associated with a business. Generally, the term "proprietor," as used here, may also refer to distributors and/or suppliers. In other words, the term proprietor may also apply to various operations on the manufacturing side, including the operations responsible for parts, labor, and/or retail of the article of footwear, as well as other manufacturing side operations.

Embodiments may include one or more of the methods, processes, structures, features and/or systems disclosed in Cook et al., U.S. patent application Ser. No. 15/055,113, filed Feb. 26, 2016, and titled "Method of Customizing Heel Cushioning in Articles of Footwear"; Cook et al., now U.S. patent application Ser. No. 15/055,129, filed Feb. 26, 2016, and titled "Method of Customizing Forefoot Cushioning in Articles of Footwear"; Cook et al., now U.S. patent application Ser. No. 15/055,016, filed Feb. 26, 2016, and titled "Method of Customizing Articles of Footwear"; all of these applications are hereby incorporated by reference in their entirety.

The embodiments described herein may also include or refer to techniques, concepts, features, elements, methods, and/or components from Kohatsu et al., U.S. Pat. No. 9,861,159, published Jan. 9, 2018, (previously U.S. patent application Ser. No. 14/722,758, filed May 27, 2015), titled "Article of Footwear Comprising a Sole Member with Apertures," Kohatsu et al., U.S. patent application Ser. No. 14/722,826, filed May 27, 2015), titled "Article of Footwear Comprising a Sole Member with Geometric Patterns," Kohatsu et al., U.S. Pat. No. 9,775,405 published Oct. 3, 2017, (previously U.S. patent application Ser. No. 14/722,740, filed May 27, 2015), titled "Article of Footwear Comprising a Sole Member with Regional Patterns," and Kohatsu et al., U.S. patent application Ser. No. 14/722,782, filed May 27, 2015, titled "Article of Footwear Comprising a Sole Member with Aperture Patterns," the entirety of each application being herein incorporated by reference.

FIG. 1 shows a computer monitor 100 having a screen 102, displaying a purchase history of a customer, according to an embodiment. This purchase history may be recorded at the time of purchases made by the customer. In some embodiments, the purchase history may show the customer's identification information. For example, as shown in FIG. 1, the purchase history may show a customer's identification information 104 as an identification number. The term "customer identification information" refers to any information that can be used to track a customer's purchases (and/or other information) over time. This information could include name, address, and/or other identifying information.

In some embodiments, the purchase history may show purchase data for individual purchases. For example, in some embodiments, as shown in FIG. 1, the purchase history may show first purchase data 106, second purchase data 108, and third purchase data 110. The example in FIG. 1 shows each set of purchase data showing the purchase date, which may include the date upon which the purchase was made. First purchase data 106 shows that the first purchase was made in April of 2014. Second purchase data 108 shows that the second purchase was made in December of 2014. Third purchase data 110 shows that the third purchase was made in May of 2015. In some embodiments, the purchase history may show the style of an article of footwear purchased. For example, first purchase data 106, second purchase data 108, and third purchase data 110 may show that the same style of an article of footwear (style XXXX) was purchased three times in a row. This data may help show which style is being compared with another, which may be a factor considered when determining the type of sole structure to recommend to the customer for the next purchase.

In some embodiments, the purchase history may show the type of sole structure provided by the article of footwear. For example, first purchase data 106 may show a "maximum firmness" midsole, second purchase data 108 may show a "maximum lateral cushioning" midsole, and third purchase data 110 may show a "medium lateral cushioning" midsole. The type of sole structure provided by each article of footwear may be a factor considered when determining the type of sole structure to recommend to the customer for the next purchase.

In some embodiments, the purchase history may show customer evaluations of particular sole structures, which may be a factor considered when determining the type of sole structure to recommend to the customer for the next purchase. For example, as shown in FIG. 1, first purchase data 106 may show a customer evaluation of the stability of the maximum firmness midsole. Similarly, second purchase data 108 may show a customer evaluation of the stability of a maximum lateral firmness midsole and third purchase data 110 may show a customer evaluation of the stability of a medium lateral cushioning midsole. The way that the customer's evaluations are used to customize an article of footwear for the same customer is described in more detail with respect to FIG. 2 below.

Figure 4:
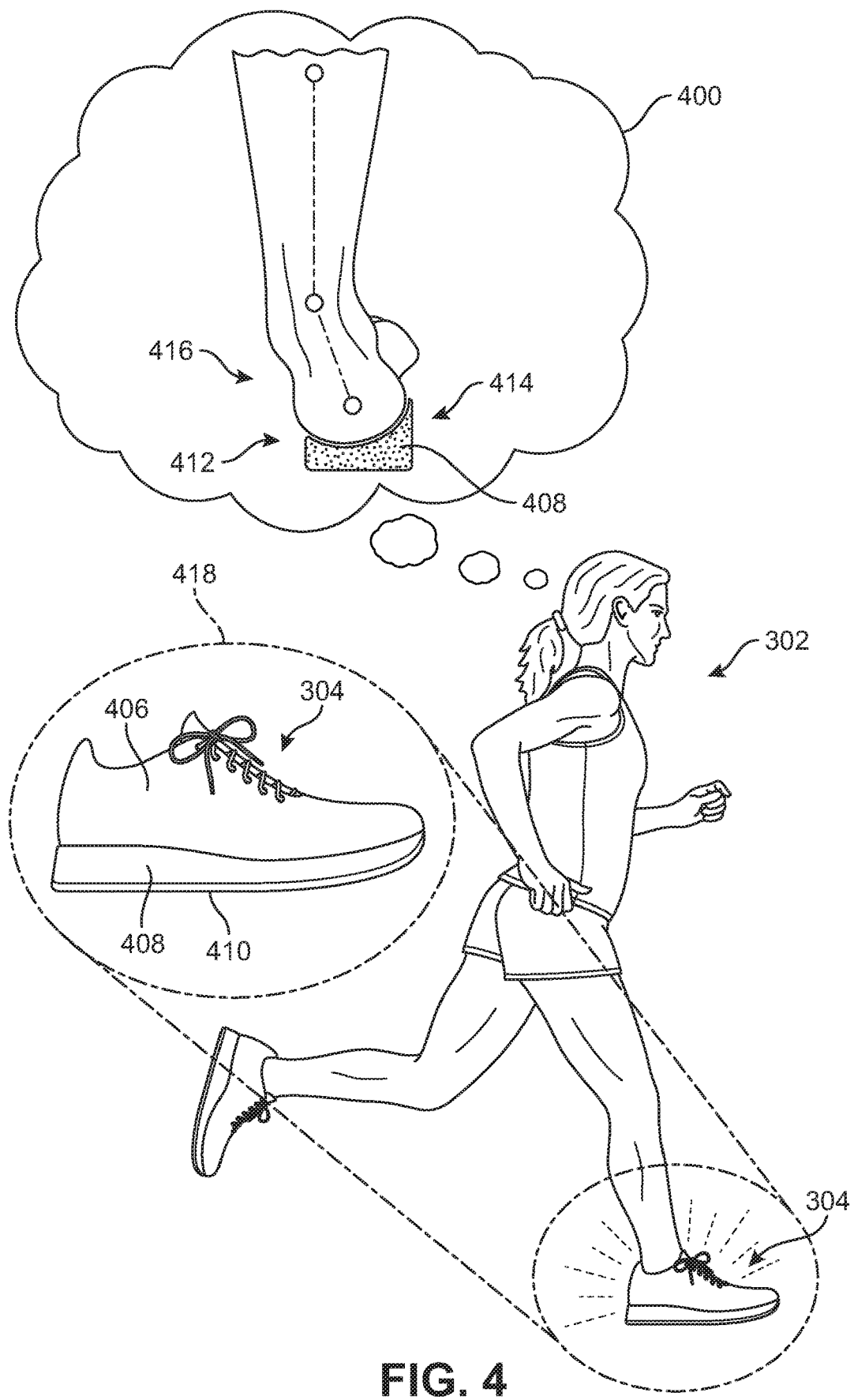
FIG. 4 shows the customer running in the first article of footwear from the embodiment of FIG. 3.

As previously mentioned, FIG. 2 illustrates a method of customizing an article of footwear, according to an embodiment. In some embodiments, as shown in FIG. 2, the method may include a step 202, which is a step of manufacturing a first article of footwear having a first sole structure and a first heel stiffness profile. The first article of footwear may have a toe region, a heel region opposite the toe region, and a midfoot region disposed between the toe region and the heel region. The first article of footwear may have a medial side and a lateral side opposite the medial side. In some embodiments, first sole structure may include a single layered sole structure or, as shown in the drawings, an article of footwear having multiple layers, including a midsole, outsole, and/or insole. For example, FIG. 4 shows an article of footwear 304 having a sole structure with a midsole 408 and an outsole 410 (see zoomed in view 418). The first article of footwear may include other features, such as an upper. For example, FIG. 4 shows an article of footwear 304 having an upper 406.

The material selected for the sole structure of the first article of footwear, as well as the sole structure of any subsequent articles of footwear (e.g., the second article of footwear) may possess sufficient durability to withstand the repetitive compressive and bending forces that are generated during running or other athletic activities. In some embodiments, the material(s) may include foams; polymers such as urethane or nylon; resins; metals such as aluminum, titanium, stainless steel, or lightweight alloys; or composite materials that combine carbon or glass fibers with a polymer material, ABS plastics, PLA, glass-filled polyamides, stereolithography materials (epoxy resins), silver, titanium, steel, wax, photopolymers, and polycarbonate. The sole structure may also be formed from a single material or a combination of different materials. For example, one side of a sole structure may be formed from a polymer whereas the opposing side may be formed from a foam material. In addition, specific regions may be formed from different materials depending upon the anticipated forces experienced by each region.

Figure 8:
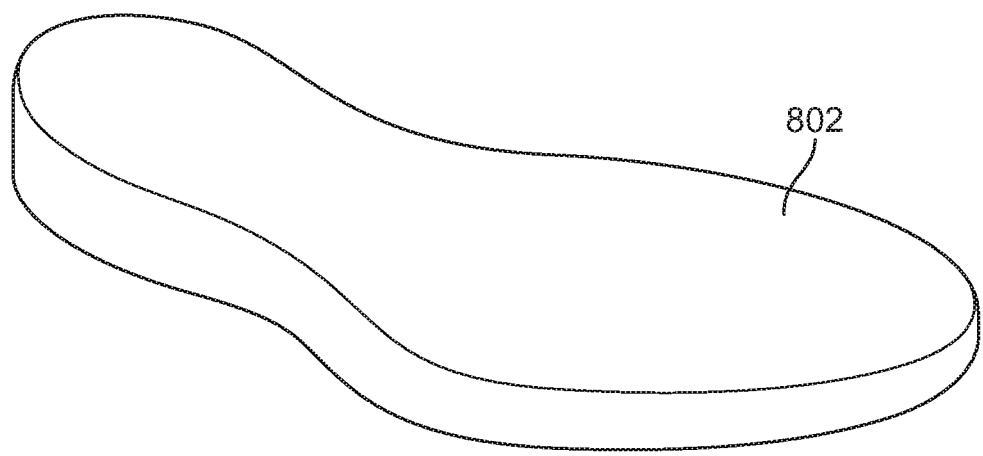
FIG. 8 shows the midsole selected in FIG. 7.

First heel stiffness profile may include any type of heel stiffness profile. Assigning a heel stiffness profile to the article of footwear may provide a starting point for gathering data about the customer. As explained below with respect to further steps, the customer will try out the first article of footwear and provide feedback that is used to prepare the next article of footwear to the customer. In some embodiments, including the example used in the drawings, the first article of footwear may include a maximum firmness profile. In such an embodiment, the sole structure may include a solid block of material. For example, FIG. 8 shows an example of a midsole that is a solid block of material. By starting with a solid block of material, the sole structure may be at maximum firmness, and may be adjusted to be more compressible in certain regions by removing material in such regions. Removing material, or subtractive manufacturing, may be used in targeted regions to enhance stability, since stability is provided (at least in part) by differences in the compressibility of the sole structure between the lateral and medial sides. As discussed in more detail with respect to FIGS. 9-10, 13, and 26 below, removing material (e.g., drilling or lasering horizontal apertures or grooves through the lateral sides) may create zones that compress more easily and thus change the stability of the sole structure, and thus the article of footwear.

Figure 13:
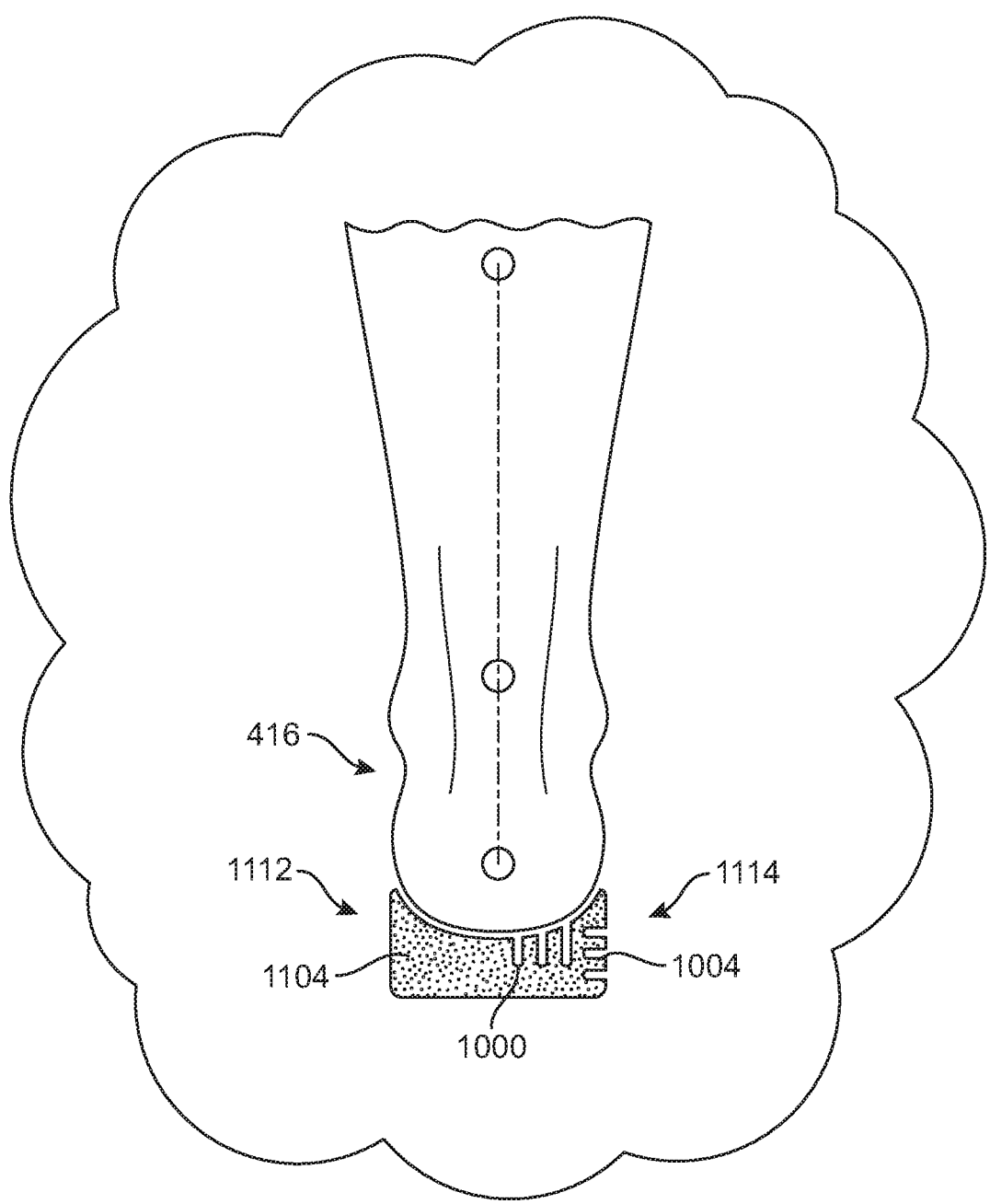
FIG. 13 shows the modified midsole shown in FIG. 10 responding to a force applied by a wearer's heel.

In some embodiments, the sole structure of the first article of footwear may start with a heel stiffness profile selected by the customer. For example, a customer may already know that he or she over-pronates. Accordingly, the customer may want to first try a sole structure having a heel stiffness profile adjusted to enhance stability for a wearer who over-pronates. Such a sole structure may cause the ground reaction forces to be more concentrated in the medial side of a foot than along the lateral side of a foot, thereby reducing the probability that the foot will over-pronate. For example, as discussed in more detail below, FIG. 13 shows a midsole 1104 that is modified to compensate for a wearer who over-pronates.

Figure 3:
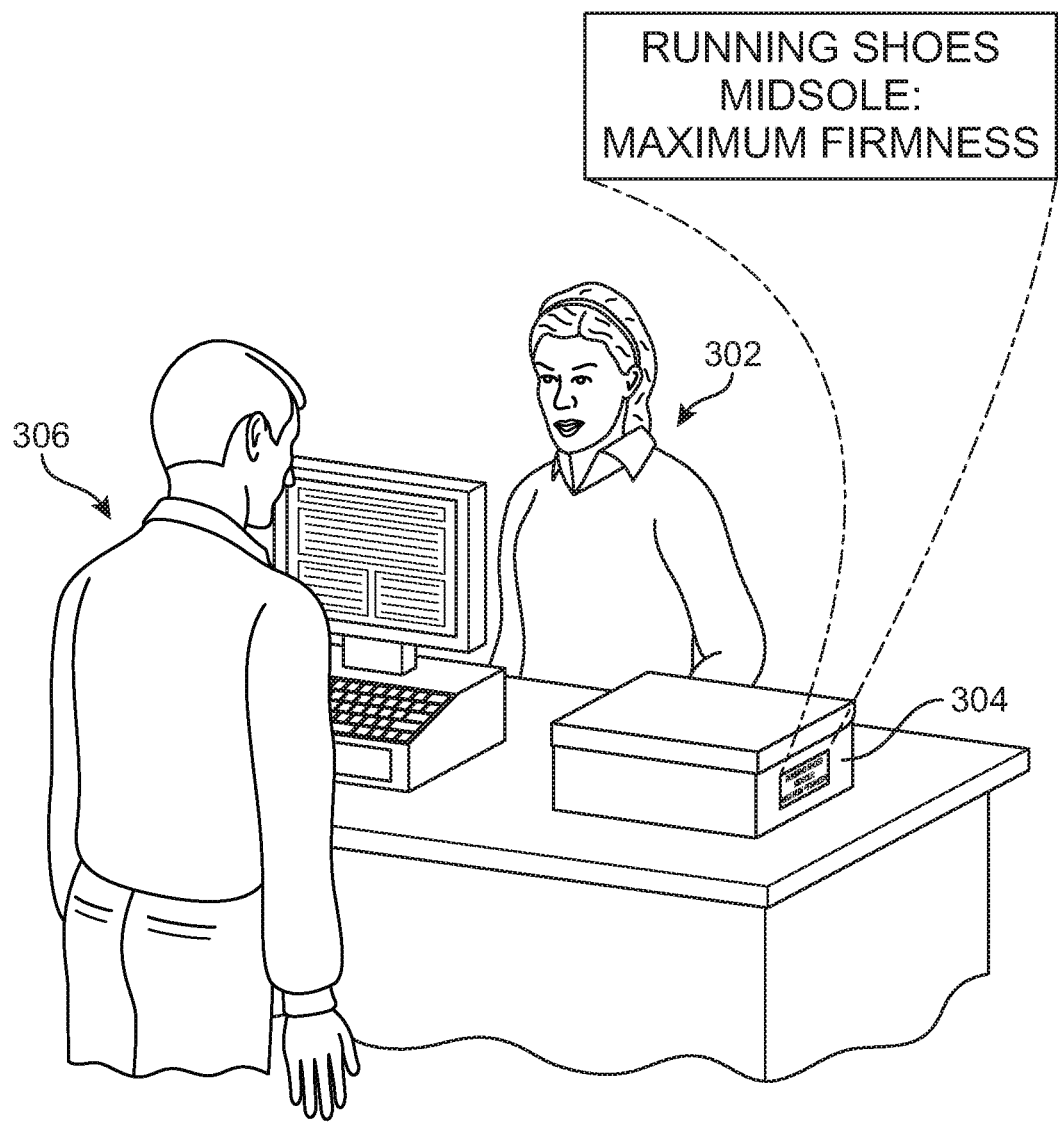
FIG. 3 shows a salesman providing a first article of footwear to a customer.

Generally, the disclosed method of customizing an article of footwear may include providing a user/customer with an article of footwear. For example, in some embodiments, as shown in FIG. 2, the method may include a step 204, which is a step of providing the first article of footwear to a customer. As shown in FIG. 3, in some embodiments, step 204 may include selling first article of footwear 304 (e.g., inside a box) to customer 302 and placing the first article of footwear in the customer's possession. In this example, the first article of footwear may be a pair of running shoes with a midsole having maximum firmness.

For example, as shown in FIG. 3, a salesperson 306 may charge customer 302 for the article of footwear 304 and hand the first article of footwear over to the customer. In another example, the customer may order the article of footwear from an Internet site, and the article of footwear may be shipped to the customer. In some embodiments, step 204 may include providing the customer with the article of footwear free of charge.

Generally, the disclosed method of customizing an article of footwear may include getting evaluation information about the stability of the article of footwear from a survey. For example, in some embodiments, as shown in FIG. 2, the method may include a step 208, which is a step of receiving a customer evaluation of heel stability of the first article of footwear. In some embodiments, for example, as shown in FIG. 2, method/customization cycle 200 may include a step 206, which is a step of providing an evaluation system to the customer, so that the customer may submit the customer evaluation. By specifically providing the user with an evaluation system indicating the degree to which the customer likes the stability of the current article of footwear, the feedback may be used to modify the stability of the next article of footwear.

Figure 5:
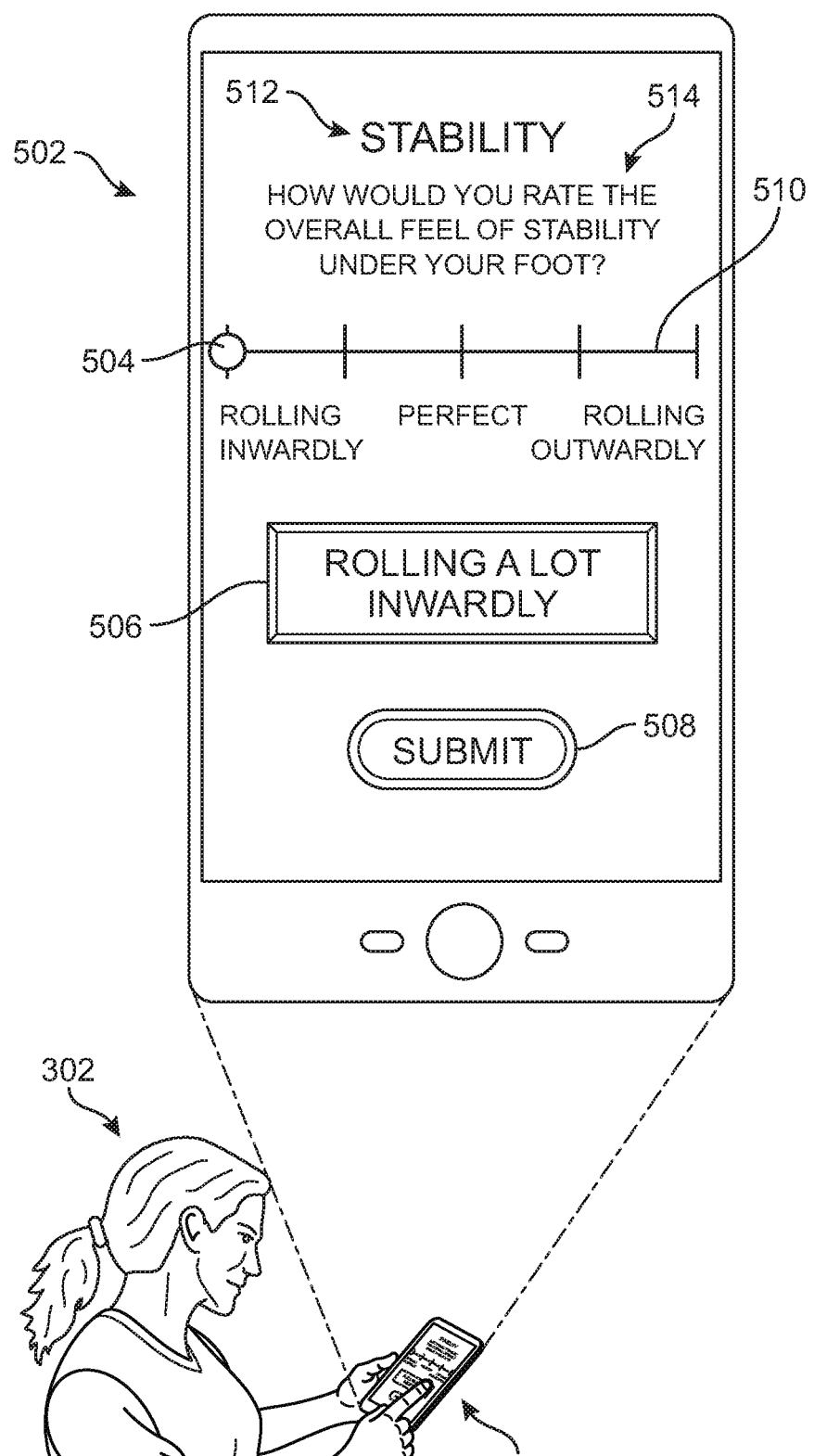
FIG. 5 shows the customer rating the first article of footwear.

In some embodiments, the evaluation system may be provided by a paper survey. In other embodiments, step 206 may include providing the user with an evaluation system via a device, such as a mobile device (e.g., smartphone) or a personal computer/computer tablet. For example, FIG. 5 shows customer 302 receiving an evaluation system via a mobile device 502. FIG. 5 additionally shows a screen of the customer evaluation system that the customer may use to rate the first article of footwear. It is understood that such information may also be provided in other formats. For example, a paper survey may ask for the same information by providing the same options, and having the customer circle an option. In yet another example, a salesperson may verbally ask the customer for stability feedback, and the salesperson may input the feedback into a computer system to be stored as part of the customer's purchase history.

In addition to showing a customer receiving the evaluation system via a mobile device, FIG. 5 further shows an example screen of the way an evaluation system may look. It is understood that this screen is merely an example, and that the information may be provided to the customer in a variety of different ways. The objective of the evaluation system is to provide a way for the customer to communicate his or her rating of heel stability of the article of footwear. In some embodiments, for example, in FIG. 5, the evaluation system may be used to communicate the customer's rating of the heel stability of the article of footwear. The evaluation system may include a rating of stability (e.g., heel stability) of the sole structure that is based on multiple options of ratings. In this particular example, the user may select a heel stability rating from five options of stability ratings provided as tic marks along a scroll bar 510. The scroll bar may show "just right" in the middle, "rolling outwardly" to the far right, and "rolling inwardly" to the far left. The tic marks may indicate different points along the spectrum between these three ratings on the scroll bar. In some embodiments, evaluation system may include a title 512, indicating which characteristic of the article of footwear is being reviewed by the customer. In some embodiments, a question 514 may help direct a customer in reviewing the article of footwear.

In other embodiments, the tic marks may be absent and the user may select any point along the scroll bar. In yet other embodiments, more or less options may be provided. For example, the rating/evaluation system may only offer the options of "just right," "rolling inwardly," and "rolling outwardly." In another example, more options may be offered to indicate a lesser degree of rolling inwardly and/or rolling outwardly.

The tic mark at the far right of the scroll bar in FIG. 5 may correspond with "rolling a lot outwardly," while the tic mark between "just right" and tic mark on the far right of the scroll bar shown in FIG. 5 may correspond with "rolling a little outwardly." The tic mark at the far left of the scroll bar in FIG. 5 may correspond with "rolling a lot inwardly," while the tic mark between "just right" and the tic mark on the far left of the scroll bar shown in FIG. 5 may correspond with "rolling a little inwardly." In some embodiments, as shown in FIG. 5, the screen of the evaluation system may provide a selector 504, and the customer may move the selector to the customer's selected option. In some embodiments, as shown in FIG. 5, the screen may confirm the customer's option by displaying the selected option in another area of the screen, such as a box 506. In some embodiments, as shown in FIG. 5, the screen may offer a submit button 508. Accordingly, when using the embodiment shown in FIG. 5, the customer may do the following: move the selector to the selected option, verify the selected option by reviewing option appearing in box, and press the submit button.

Figure 21:
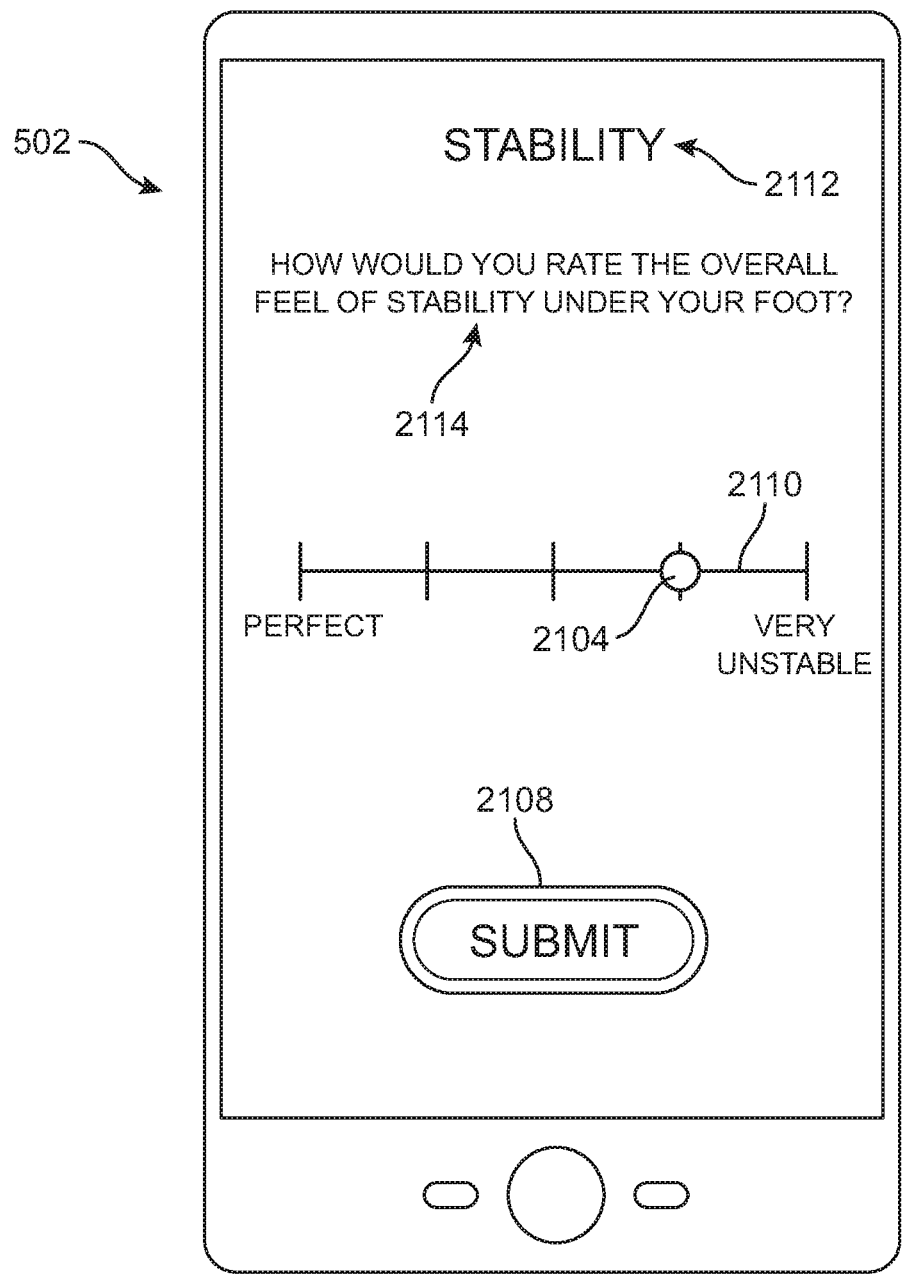
FIG. 21 shows an alternative embodiment of a customer evaluation system.

In other embodiments, the evaluation system may include a rating of 1 to 5 with "1" being assigned as "rolling inwardly" and "5" being assigned as "perfect." In yet another embodiment, for example, as shown in FIG. 21, the general stability of the article of footwear may be evaluated by the customer. In such an embodiment, a scroll bar 2110 may include "perfect" on the far left and "very unstable" on the far right, with tic marks indicating varying degrees of stability in between these two extreme options. Similar to the evaluation system shown in FIG. 5, the evaluation system of FIG. 21 may include a title 2112, a question 2114, and a submit button 2108. It is understood that the evaluation system in other embodiments may include some or all of the features shown in the embodiments of FIGS. 5 and 21. It is also understood that the evaluation system in other embodiments may include other features instead of or in addition to the embodiments of FIGS. 5 and 21.

As mentioned above, in some embodiments, as shown in FIG. 2, the method may include a step 208, which is a step of receiving a customer evaluation of heel stability of the first article of footwear. In some embodiments, the customer may test the article of footwear. For example, as shown in FIG. 4, customer 302 may wear article of footwear 304 during a certain activity, such as running. In another example, the activity may be walking and/or playing a sport. After testing the article of footwear one or more times, the customer may provide a heel evaluation of the article of footwear. For example, in some embodiments, the customer may wear the article of footwear only once before filling out an evaluation of the article of footwear. In another example, in some embodiments, the customer may wear the article of footwear daily over the course of 2 weeks. In yet another example, in some embodiments, the customer may wear the article of footwear periodically over the course of 6 months. After the 6 months passes, the customer may be ready to purchase a new article of footwear, and may then fill out an evaluation of the article of footwear.

In the example shown in FIG. 4, the customer feels that her heels (e.g., right heel 416) are rolling inwardly as she runs. As a result, midsole 408 compresses more on a medial side 414 of a heel region of the midsole than a lateral side 412 of the heel region. Because customer 302 feels that her heels are rolling inwardly a lot, she selects the highest degree of "rolling inwardly" on the scroll bar of the evaluation in FIG. 5. To select this option, customer 302 moves selector 504 to the tic mark that is positioned on the far left of scroll bar 510. Box 506 may display that "rolling inwardly a lot" has been selected to allow the customer to verify which option has been selected. The customer may select the "submit" button to submit the evaluation to the entity (e.g., a footwear company) performing the method of customizing an article of footwear. Pressing the submit button may cause the customer's evaluation to be sent from mobile device 502 to a server 602 through a network 600 (see FIG. 6). The details of communication between the mobile device and other equipment are discussed in more detail below. The information from the customer's evaluation may be stored in a database 604 (see FIG. 6). The next time the customer purchases an article of footwear, the information from the customer's evaluation information may be retrieved from database 604. For example, as shown in FIG. 7, a factory worker 700 may retrieve the customer's evaluation information, which is shown on a screen of a monitor 702.

Figure 6:
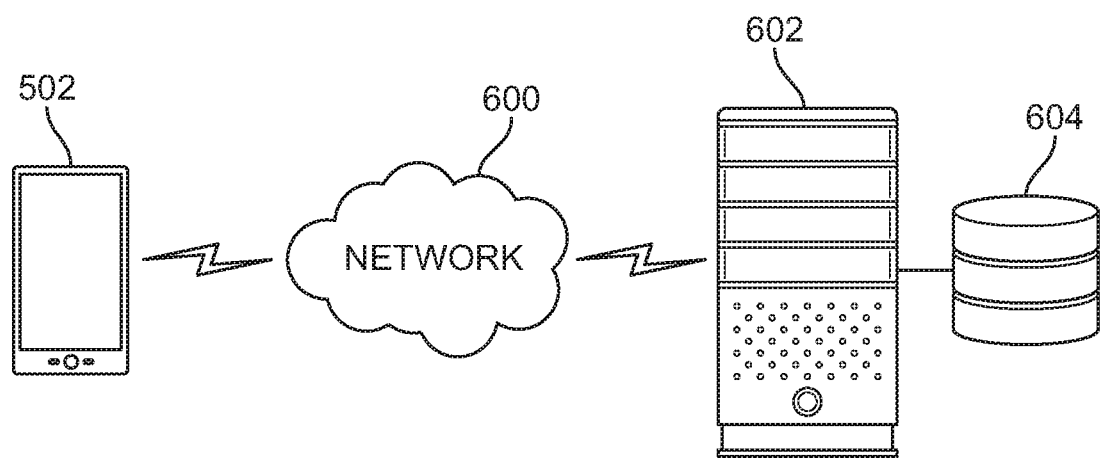
FIG. 6 shows a configuration of communication equipment.
Figure 7:
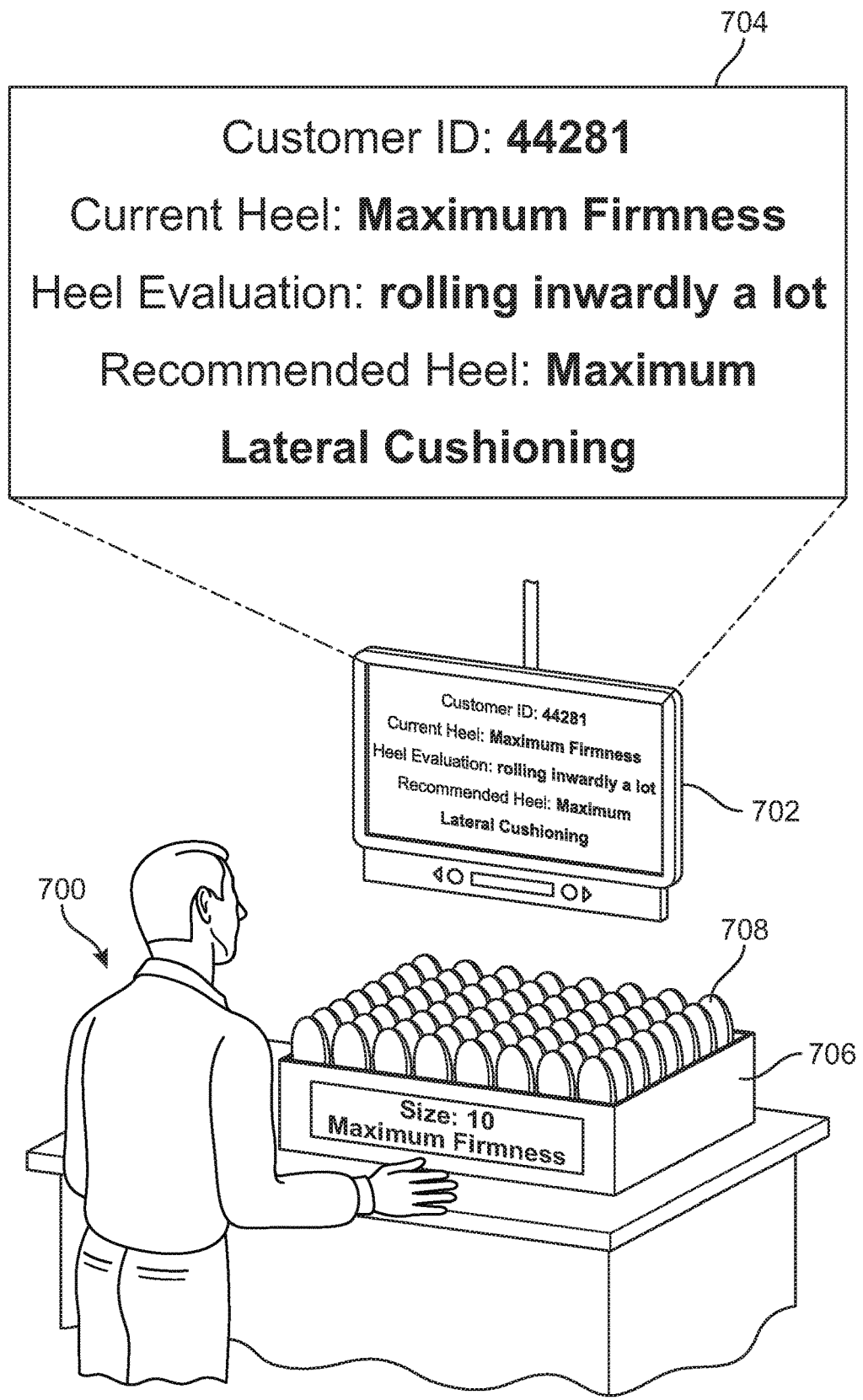
FIG. 7 shows a factory worker viewing a customer's evaluation information and selecting a midsole.

FIG. 6 shows an embodiment of a configuration of communication equipment. Server 602 may communicate with mobile device 502 over network 600. Server 602 may provide information to, and/or receive information from, mobile device 502. In some embodiments, for example, evaluation information, such as a customer-selected evaluation, may be transmitted by mobile device 502 to server 602 over network 600. Upon receiving the evaluation information, server 602 may store some or all of the information in database 604. In particular, the evaluation information could be stored in one or more tables associated with a particular set of customer identification information. Furthermore, a manufacturer may access information in database 604, such as evaluation information, when preparing to manufacture a new article of footwear for a customer that has provided the evaluation information and placed an order for a new pair of footwear.

Both server 602 and mobile device 502 may be considered more broadly as general "computing systems." Generally, the term "computing system" refers to the computing resources of a single computer, a portion of the computing resources of a single computer, and/or two or more computers in communication with one another. Any of these resources can be operated by one or more human users. In some embodiments, a computing system may include one or more servers. Computing systems may include a microprocessor, RAM, ROM, and software. Both current and electronically stored signals may be processed by a central processing unit (CPU) in accordance with software stored in an electronic memory, such as ROM. A computing system can also include one or more storage devices including, but not limited to, magnetic, optical, magneto-optical, and/or memory, including volatile memory and non-volatile memory.

Network 600 may include any wired or wireless provisions that facilitate the exchange of information between mobile device 502 and server 602. In some embodiments, network 600 may further include various components such as network interface controllers, repeaters, hubs, bridges, switches, routers, modems, and firewalls. In some cases, network 600 may be a wireless network that facilitates wireless communication between two or more systems, devices, and/or components of a customization system. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 600 could be a wired network including networks whose signals are facilitated by twister pair wires, coaxial cables, and optical fibers. In still other cases, a combination of wired and wireless networks and/or connections could be used.

Generally, the disclosed method of customizing an article of footwear may include modifying the next article of footwear provided to the user/customer according to the customer's evaluation information. For example, as shown in FIG. 2, the method may include a step 214, which is a step of adjusting a second sole structure of a second article of footwear to have a second heel stiffness profile. The second article of footwear may have a toe region, a heel region opposite the toe region, and a midfoot region disposed between the toe region and the heel region. The second article of footwear may also have a lateral side and a medial side opposite the lateral side. In some embodiments, as shown in FIG. 2, the method may include a step 210, which is a step of manufacturing a second article of footwear having a second sole structure. In some embodiments, as shown in FIG. 2, the method may include a step 212, which is a step of using the first customer evaluation of heel stability to determine a second heel stiffness profile for the second sole structure. In some embodiments, the second heel stiffness profile may be different from the first heel stiffness profile. For example, in the exemplary embodiment discussed with respect to the drawings, the first heel stiffness profile may be maximum firmness and the second heel stiffness profile may be maximum lateral cushioning. In other embodiments, the first heel stiffness profile may be the same as the second heel stiffness profile.

Step 210 of manufacturing a second article of footwear having a second sole structure may include providing a midsole. For example, the midsole may be provided by being made or purchased. In some embodiments, as shown in FIG. 7, a plurality of midsoles may be made (e.g., by the manufacturer of the second article of footwear or a third party) and stored in a bin 706. For example, bin 706 may store a plurality of midsoles 708. In such embodiments, a midsole may be selected from the bin and may be incorporated into the second article of footwear. In the example shown in FIG. 7, bin 706 may store a plurality of midsoles 708 having the features of having maximum firmness and fitting a size 10 running shoe. In other embodiments, the stored midsoles may have different features.

The midsole for the second article of footwear may be a midsole having maximum firmness. Such a midsole may be a solid block of material. FIG. 8 shows an example of a midsole having maximum firmness.

In some embodiments, step 210 may include assembling pre-made parts of an article of footwear to make the article of footwear. For example, a midsole, upper, and outsole may be taken from a shelf inside a factory and assembled to form an article of footwear. In other embodiments, step 210 may further include making the parts of an article of footwear and then assembling the parts to form an article of footwear.

In some embodiments, as shown in FIG. 2, the method may include a step 212, which is a step of using the first customer evaluation of heel stability to determine a second heel stiffness profile for the second sole structure. FIG. 7 illustrates factory worker 700 viewing the customer's information on the screen of monitor 702. A zoomed in view 704 of the screen of monitor 702 shows an example of customer information from an evaluation. The customer information may include the customer ID, current heel (which is the heel of the shoe the customer is reviewing), heel evaluation, and recommended heel (which is the heel recommended in response to the customer's review).

Referring to the example of FIG. 7, because the customer selected "rolling inwardly a lot," the second article of footwear may be modified to address this issue. For example, the heel stiffness profile selected for the second article of footwear may be a midsole having maximum lateral cushioning to compensate for the medial side of the customer's heel compressing the midsole unevenly. By modifying the midsole to compress more along the lateral side of the heel region than the medial side of the heel region, the midsole may compress more evenly beneath the customer's heel. For example, as discussed in more detail below, FIG. 13 shows modified midsole 1104 compressing evenly beneath the customer's foot.

Figure 9:
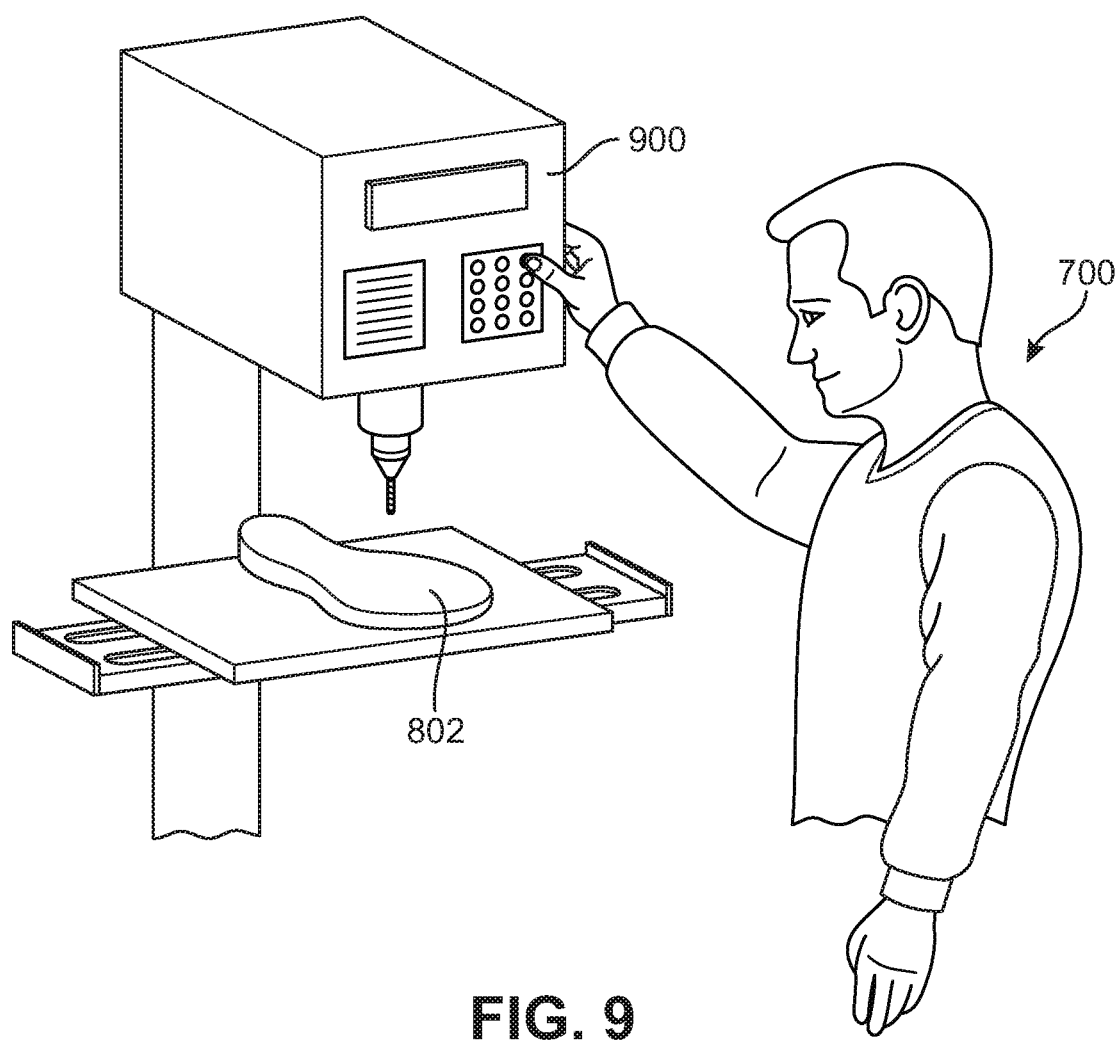
FIG. 9 shows the factory worker from FIG. 7 preparing a drilling machine to drill into a surface of the selected midsole from FIGS. 7 and 8.
Figure 10:
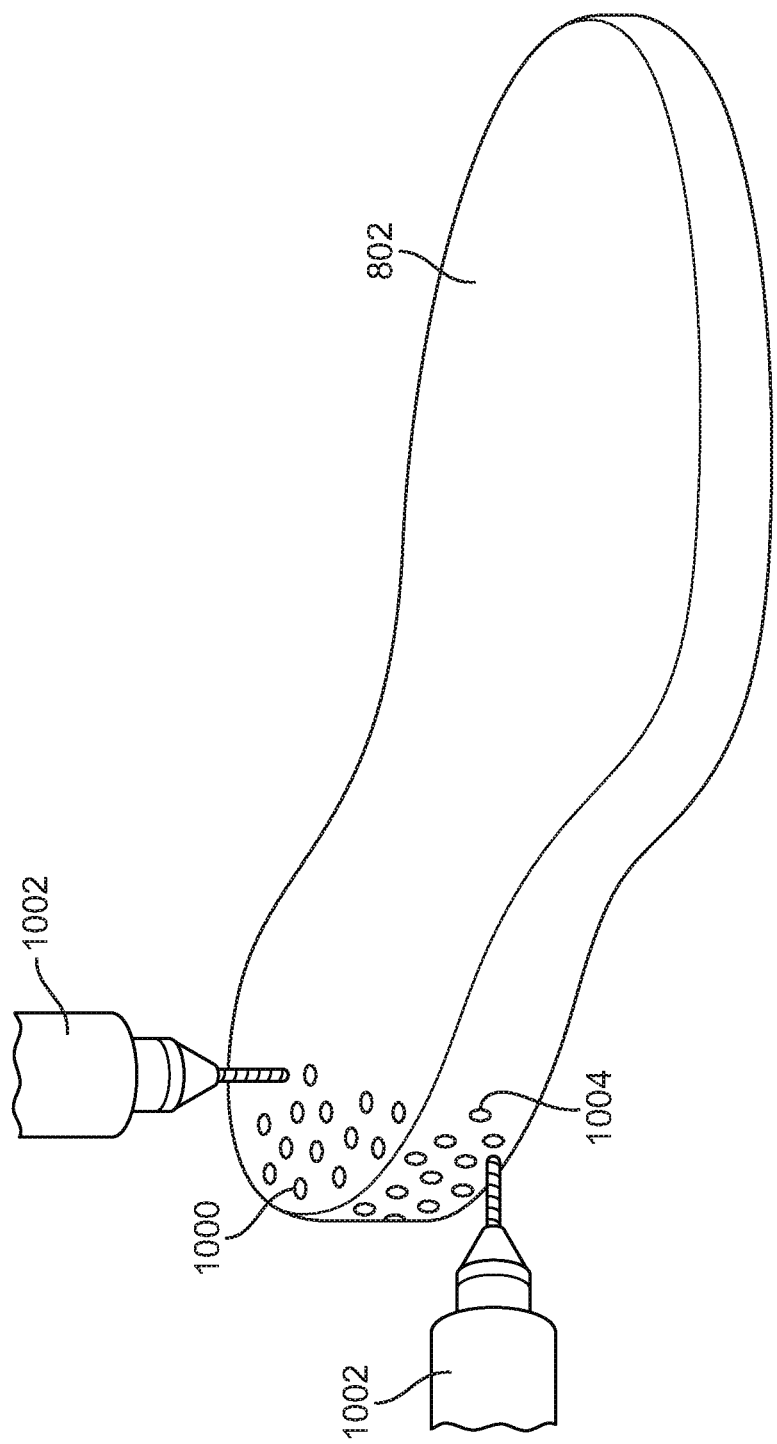
FIG. 10 shows drills drilling apertures into the selected midsole form FIGS. 7 and 8.
Figure 11:
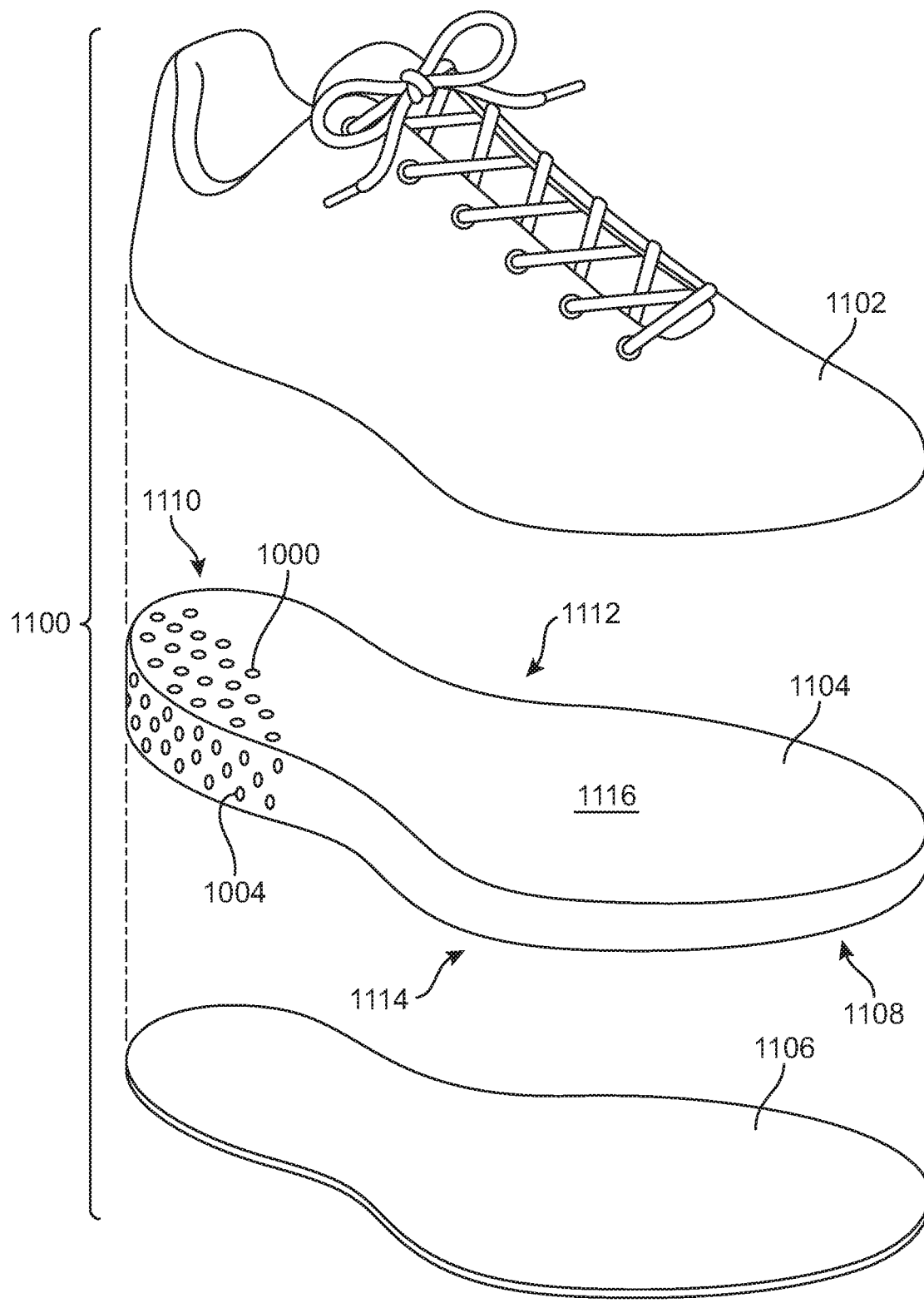
FIG. 11 shows an exploded view of a second article of footwear, incorporating the modified midsole shown in FIG. 10.

In some embodiments, as shown in FIG. 2, the method may include a step 214, which is a step of adjusting the second sole structure of the second article of footwear to have the second heel stiffness profile. FIG. 7 shows the factory worker selecting a midsole from bin 706 of midsoles. Since the selected midsole 802 (shown in FIG. 8) is a solid block of material, removing bits of material in certain regions may cause such regions to have a higher compressibility. It is understood that, in some embodiments, the midsole to be modified/adjusted for the second article of footwear may already have portions of material removed before being modified. For example, the step of adjusting the second sole structure may include removing material from the second sole structure to form at least one aperture or groove to provide the second heel stiffness profile. In some embodiments, to remove material from the second midsole, a drilling machine may be used. For example, FIG. 9 shows factory worker 700 placing midsole 802 into a drilling machine 900. FIG. 10 shows how drills 1002 may be used to drill apertures 1000 and 1004 into one or more surfaces of midsole 802, and FIG. 11 shows a modified midsole 1104 resulting from the drilling process performed on midsole 802. Modified midsole 1104 may include a lateral side 1114 and a medial side 1112 opposite lateral side 1114. Modified midsole 1104 may additionally include a toe region 1108 and a heel region 1110 opposite toe region 1108. The example demonstrated in FIGS. 10-13 shows modified midsole 1104 as having apertures 1000 disposed on an upper surface 1116 of modified midsole 1104 in heel region 1110 and apertures 1004 disposed on a lateral sidewall in heel region 1110. It is understood that the apertures may be located in different areas of the sole structure instead of or in addition to the lateral sidewall and the upper surface of the sole structure in other embodiments. For example, the apertures may be disposed on a lower surface of the midsole that is opposite the upper surface of the midsole. It is further understood that the apertures may have different shapes and sizes, as discussed with respect to FIGS. 15-26 below.

Figure 26:
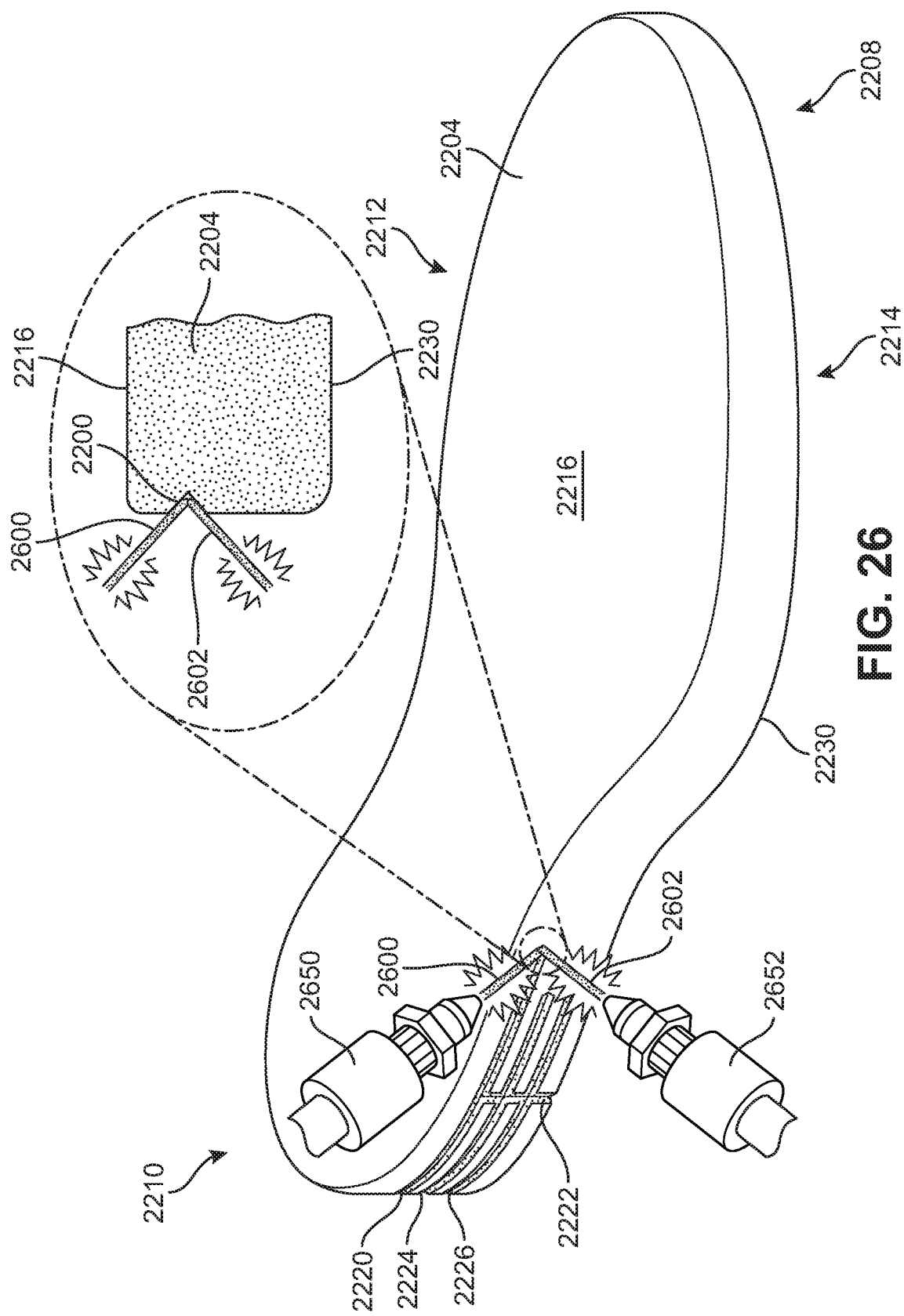
FIG. 26 shows lasers cutting a groove into the modified midsole of FIG. 22.

In some embodiments, a dremel tool or laser can be used to remove material from a sole member in a manner that forms apertures or grooves in the sole member. For example, as shown in FIG. 26, lasers may be used to form grooves in the outer surface of the sole member (modified midsole 2204). In this example, a first laser 2650 and a second laser 2652 may both be used to form a first groove 2220. First laser 2650 may be angled in a first direction causing a first laser beam 2600 to cut a surface (e.g., sidewall) of sole member 2204 along a first wall of groove 2220. Second laser 2652 may be angled in a second direction causing a second laser beam 2602 to cut the surface of sole member 2204 along a second wall of first groove 2220. The first wall and the second wall, as shown in the zoomed in cross-sectional view of FIG. 26, may both be flat and may be angled with respect to each other such that first groove 2220 has a v-shaped cross-section. In other embodiments, one or more lasers may be used to form apertures or grooves having other shapes. For example, lasers may be used to make grooves having a square-shaped cross-section.

Figure 22:
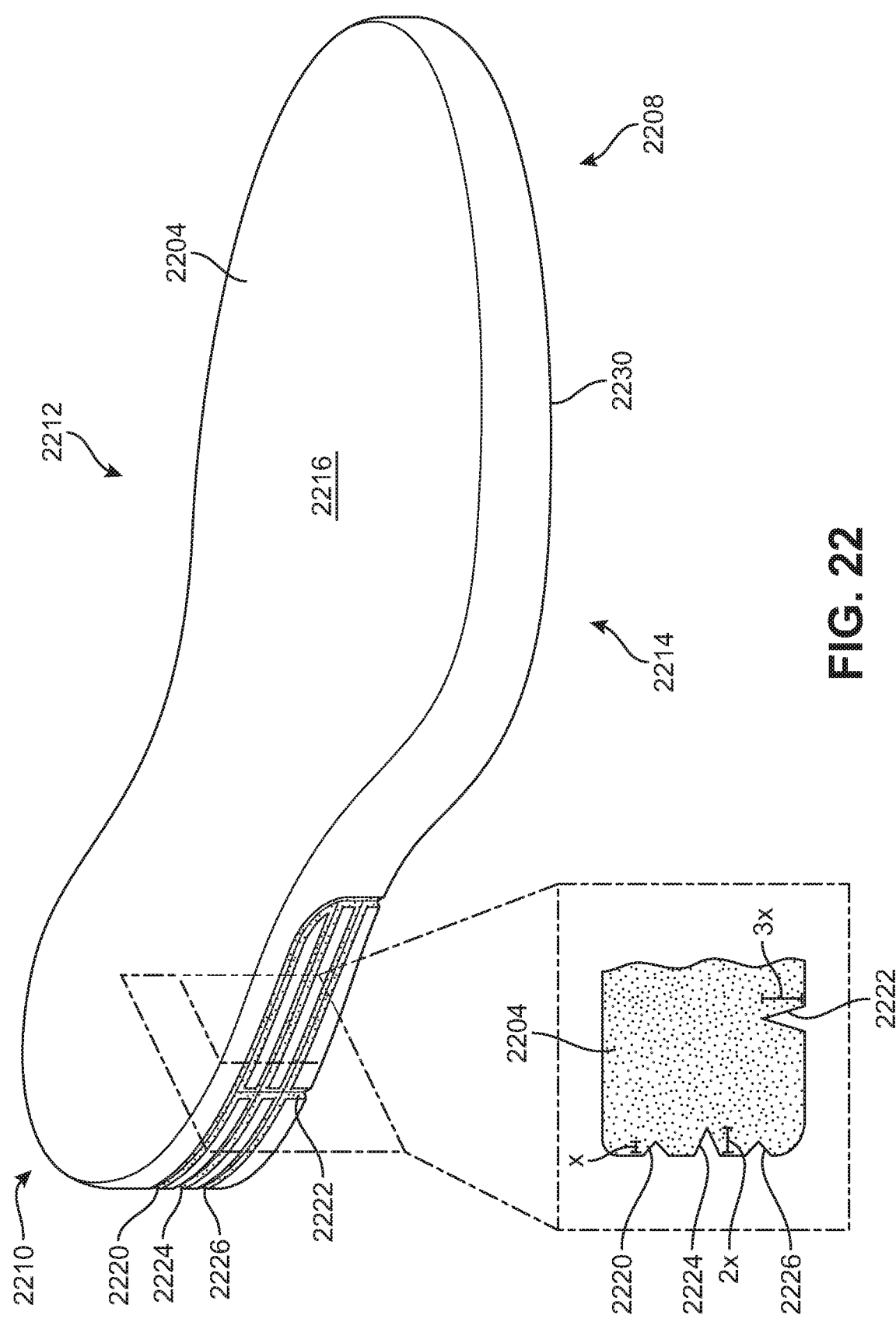
FIG. 22 shows an alternative embodiment of a modified midsole, including an isometric view and a zoomed in cross-sectional view.
Figure 23:
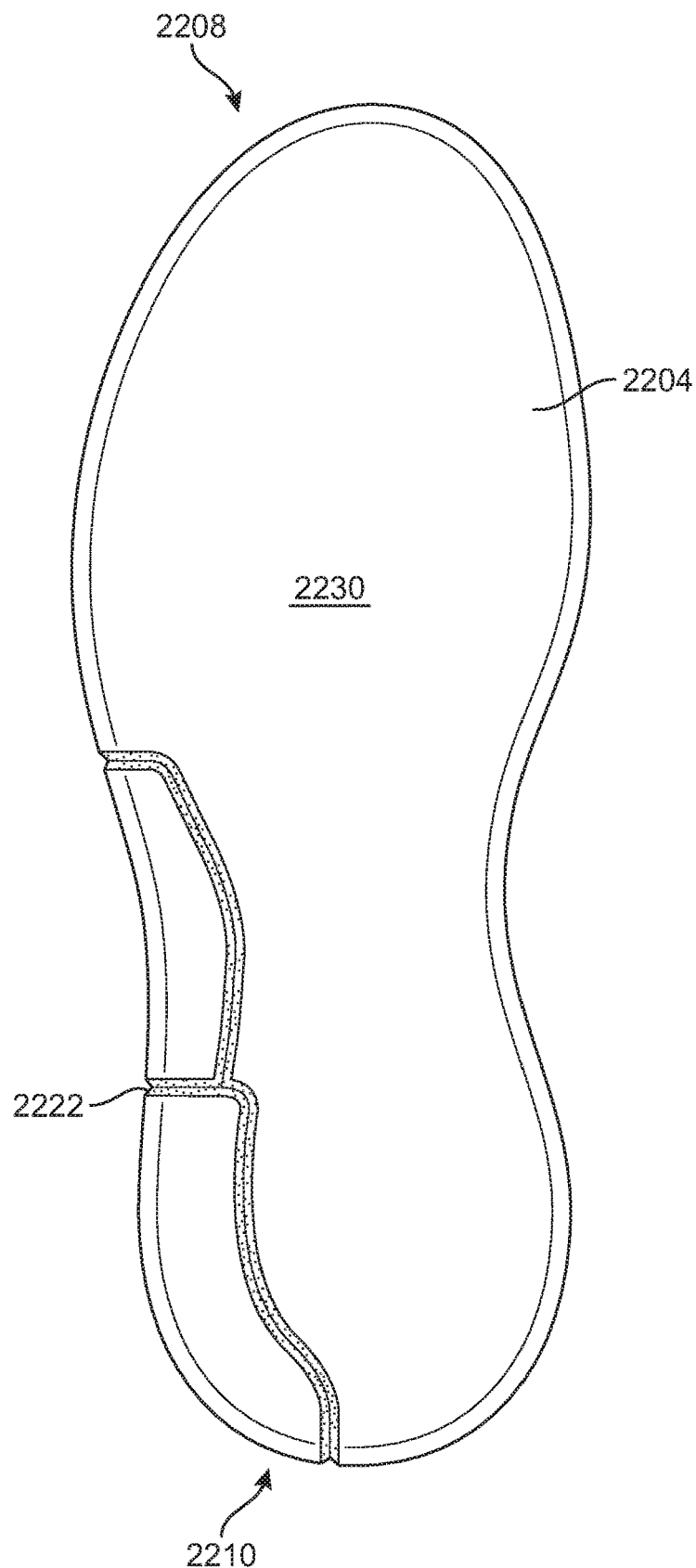
FIG. 23 shows a bottom view of the modified midsole of FIG. 22.
Figure 24:
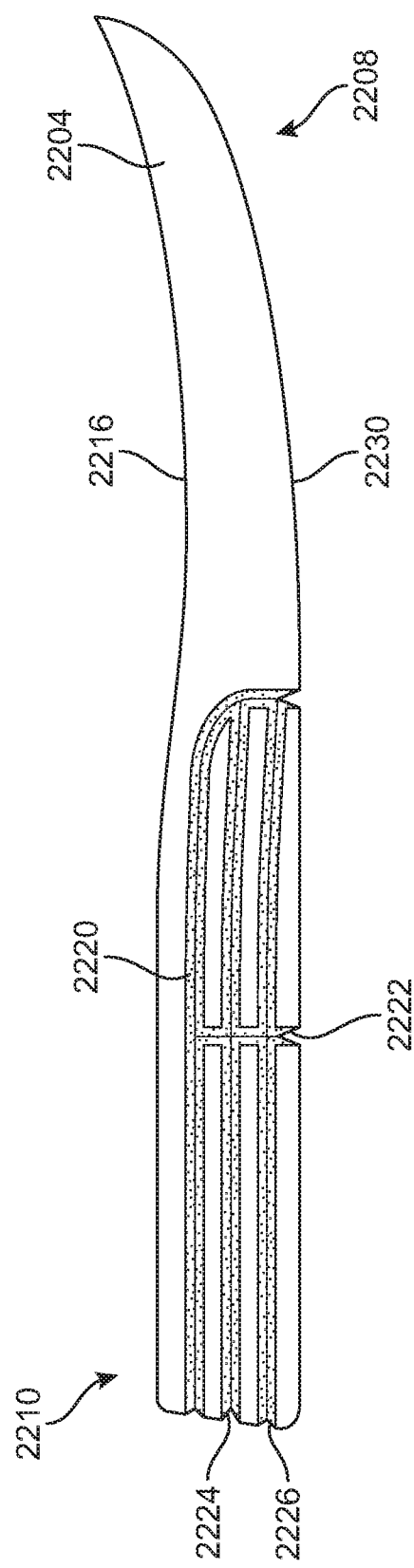
FIG. 24 shows a lateral side view of the modified midsole of FIG. 22.
Figure 25:
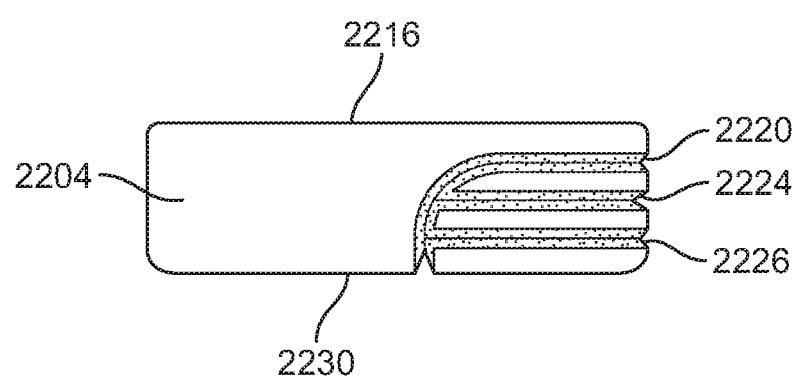
FIG. 25 shows a rear view of the modified midsole of FIG. 22.

FIG. 22 shows an alternative embodiment of modified midsole 2204, including an isometric view and a zoomed in cross-sectional view. FIG. 23 shows a bottom view of the modified midsole of FIG. 22. FIG. 24 shows a lateral side view of the modified midsole of FIG. 22. FIG. 25 shows a rear view of the modified midsole of FIG. 22. FIG. 26 shows lasers cutting a groove into the modified midsole of FIG. 22. Modified midsole 2204 may include a lateral side 2214 and a medial side 2212 opposite lateral side 2214. Modified midsole 2204 may additionally include a toe region 2208, a heel region 2210 opposite toe region 2208, a top surface 2216, and a bottom surface 2230 disposed opposite top surface 2216. The example demonstrated in FIGS. 22-26 shows that modified midsole 2204 may have a first groove 2220, a second groove 2224, a third groove 2226, and a fourth groove 2222 disposed on a lateral sidewall of modified midsole 2204. First groove 2220 and fourth groove 2222 may also be disposed on bottom surface 2230 of modified midsole 2204 (FIG. 23). The example demonstrated in FIGS. 22-26 shows that first groove 2220, a second groove 2224, a third groove 2226, and a fourth groove 2222 may be disposed in heel region 2210. It is understood that the grooves may be located in different areas of the sole structure instead of or in addition to the lateral sidewall and the bottom surface of the sole structure in other embodiments. For example, the grooves may be disposed on an upper surface of the midsole that is opposite the bottom surface of the midsole. It is further understood that the grooves may have different shapes and sizes than the shapes and sizes shown in the drawings, as discussed above. Additionally, the grooves may have different shapes and sizes from each other. For example, a first groove may have a v-shaped cross-section, while a second groove has an arcuate cross-section. In another example, as shown in FIG. 22, first groove 2220 may have a depth x. Third groove 2226 may also have the same depth x. Yet, second groove 2224 and fourth groove 2222 may have different depths from first groove 2220 and each other. For example, second groove 2224 may have a depth of 2x (twice the value of x). In another example, fourth groove 2222 may have a depth of 3x (three times the value of x). In some embodiments, the grooves may have a depth of up to five times the width of the groove. In some embodiments, the grooves may all have the same depth as one another.

It is even further understood that a different number of grooves may be provided on the midsole. For example, while the example demonstrated in FIGS. 22-26 shows four interconnected grooves, a modified midsole may include a single groove. In another embodiment, a modified midsole may include between two and 100 grooves. For example, a modified midsole may include 10 grooves. The example demonstrated in FIGS. 22-26 shows that first groove 2220, a second groove 2224, a third groove 2226, and a fourth groove 2222 create a pattern of intersecting grooves. It is understood that other patterns of grooves may be included. For example, the grooves may form a pattern of concentric circles or pattern of wavy lines.

In another embodiment, a hot knife process could be used for forming apertures in a sole member. Examples of methods for forming apertures on a sole member are disclosed in McDonald, U.S. Pat. No. 7,607,241, issued Oct. 27, 2009, titled "Article of Footwear with an Articulated Sole Structure," (previously U.S. patent application Ser. No. 11/869,604, filed Oct. 9, 2007), the entirety of which is hereby incorporated by reference. Examples of methods for forming apertures on a sole member are disclosed in Kohatsu et al., U.S. patent application Ser. No. 14/722,758, filed May 27, 2015, titled "Article of Footwear Comprising a Sole Member with Apertures," the entirety of which is hereby incorporated by reference. In other embodiments, however, any other type of cutting method can be used for forming apertures. Furthermore, in some cases, two or more different techniques can be used for forming apertures. As an example, in another embodiment, apertures disposed on a side surface of a sole member can be formed using laser cutting, while apertures on a lower surface of the sole member could be formed during a molding process. Still further, different types of techniques could be used according to the material used for a sole member. For example, laser cutting may be used in cases where the sole member is made of a foam material.

Figure 12:
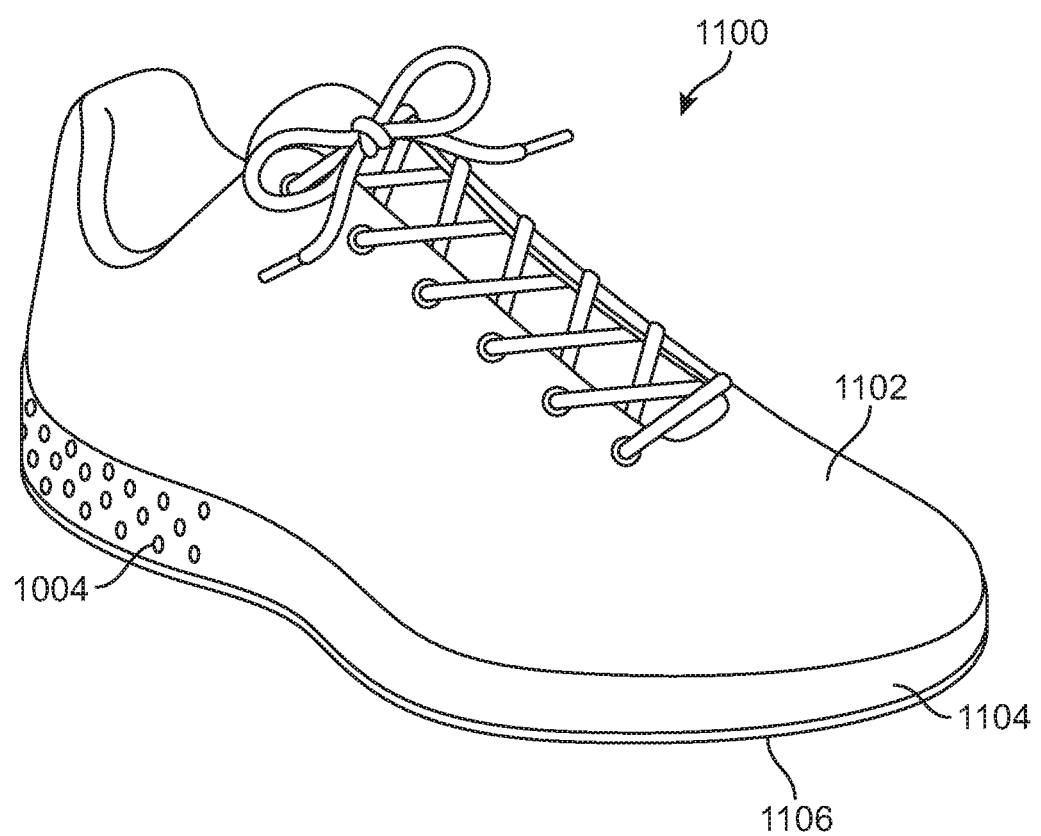
FIG. 12 shows the second article of footwear in its assembled state.

FIG. 11 shows an exploded view of a second article of footwear incorporating modified midsole 1104 customized in FIGS. 9-10. FIG. 12 discloses an assembled view of the second article of footwear 1100 from FIG. 11.

Figure 14:
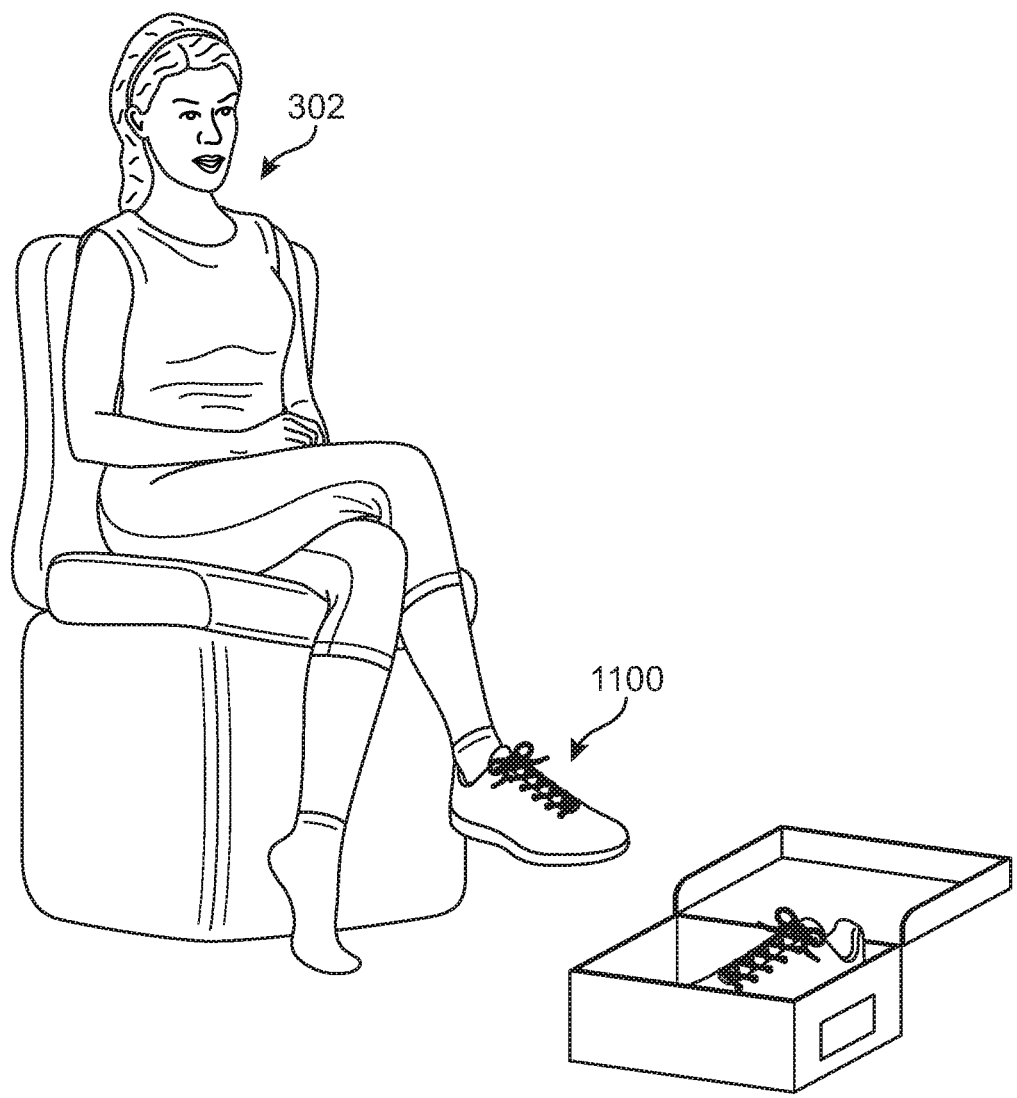
FIG. 14 shows the customer receiving the second article of footwear.

In some embodiments, as shown in FIG. 2, the method may include a step 216, which is a step of providing the second article of footwear to the customer. Step 204 may include the same options as those discussed above with respect to step 204. For example, in some embodiments, step 204 may include selling the second article of footwear to a customer in a store. In another example, as shown in FIG. 14, the customer may order the second article of footwear through the Internet, and the second article of footwear may be delivered to the customer.

Method/customization cycle 200 may be repeated multiple times to hone the fit of the article of footwear for the customer. An example of such a scenario is shown in the purchase history displayed in FIG. 1. FIG. 1 shows purchase history for a customer purchasing three different articles of footwear. Repeating method/customization cycle 200 may include repeating step 206 to provide the customer with the evaluation system. Once the customer receives the second article of footwear (FIG. 14), the customer may test the second article of footwear and provide a customer evaluation of the heel stability of the second article of footwear.

The customer's submission of the customer evaluation may cause step 208 to be repeated with an evaluation of the second article of footwear instead of the evaluation of the first article of footwear. In other words, a step of receiving the customer evaluation of the heel stability of the second article of footwear may be performed. This customer evaluation may be used to modify a third article of footwear having a toe region, a heel region opposite the toe region, a midfoot region between the toe region and heel region, a lateral side, and a medial side opposite the lateral side. For example, if the customer evaluation states that the second article of footwear rolls outwardly a little, it may be apparent that the midsole of the second article of footwear was made to be too compressible. Accordingly, a third article of footwear may be customized to have a midsole with medium lateral cushioning. In other words, the midsole of the third article of footwear may be modified in the same manner as discussed above with respect to the second article of footwear to have a lateral side of a heel region that is less compressible than the same of the maximum lateral cushioning midsole of the second article of footwear, but more compressible than the same of a maximum firmness midsole of the third article of footwear. The third article of footwear may be provided to the customer. As shown in FIG. 1, the third article of footwear having a midsole with medium lateral cushioning is rated as having stability that is just right.

Figure 15:
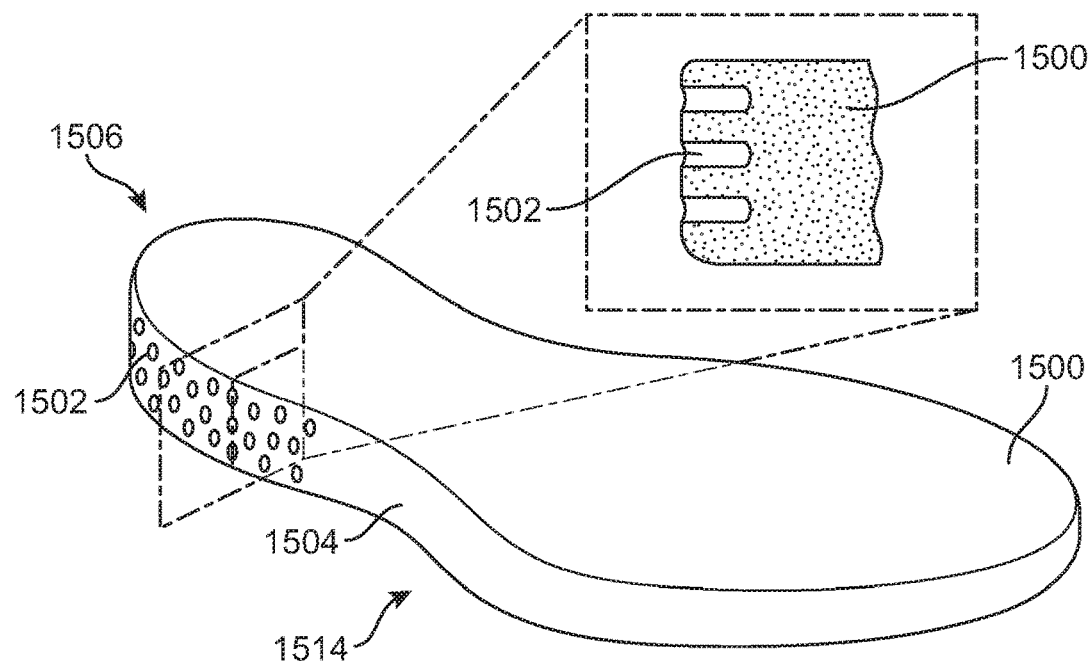
FIG. 15 shows an alternative embodiment of a modified midsole, including an isometric view and a zoomed in cross-sectional view.

FIG. 15 shows a midsole 1500 according to another embodiment. Midsole 1500 may include apertures 1502 disposed along a sidewall 1504 of a lateral side 1514 of a heel region 1506. As shown in a zoomed in cross-sectional view in FIG. 15, apertures 1502 may be cylindrical apertures.

Figure 16:
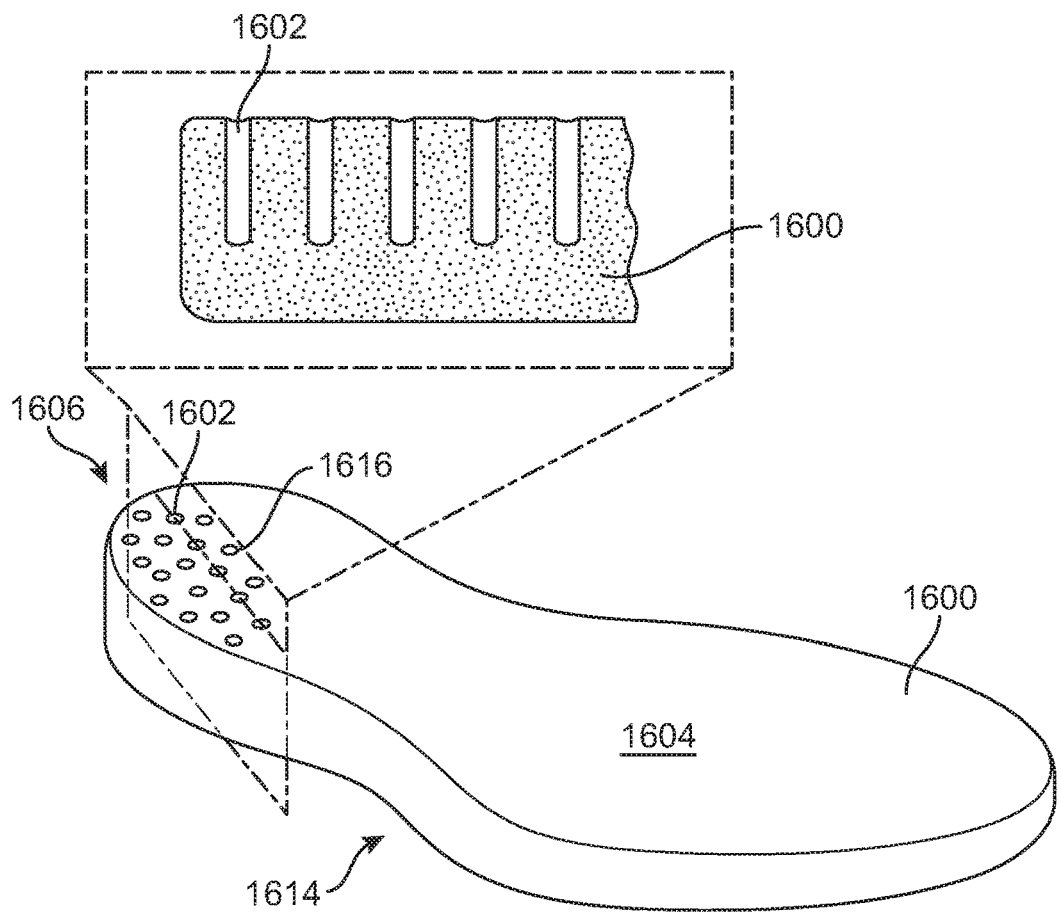
FIG. 16 shows an alternative embodiment of a modified midsole, including an isometric view and a zoomed in cross-sectional view.

FIG. 16 shows a midsole 1600 according to another embodiment. Midsole 1600 may include apertures, including a first aperture type 1602 and a second aperture type 1616, disposed along an upper surface 1604 of a lateral side 1614 of a heel region 1606. As shown in a zoomed in cross-sectional view in FIG. 16, apertures 1602 may be cylindrical apertures. FIG. 16 exemplifies how apertures may be uniform in shape and size. For example, first aperture type 1602 may be cylindrical, and second aperture type 1616 may have the same shape and size (i.e., depth and circumference) as first aperture type 1602. While FIG. 16 shows cylindrical apertures, it is understood that the midsole may include apertures having a uniform size and shape that is different from the size and shape of the apertures shown in FIG. 16. For example, the midsole may include apertures that have the same shape as those shown in FIG. 16, but with a different depth. In another example, the midsole may include apertures that each has the same conical shape as one another, as well as the same size as one another. While the FIGS. show the apertures as blind holes, it is understood that the apertures may be through holes extending from a first surface of a sole structure to a second surface of the same.

Figure 17:
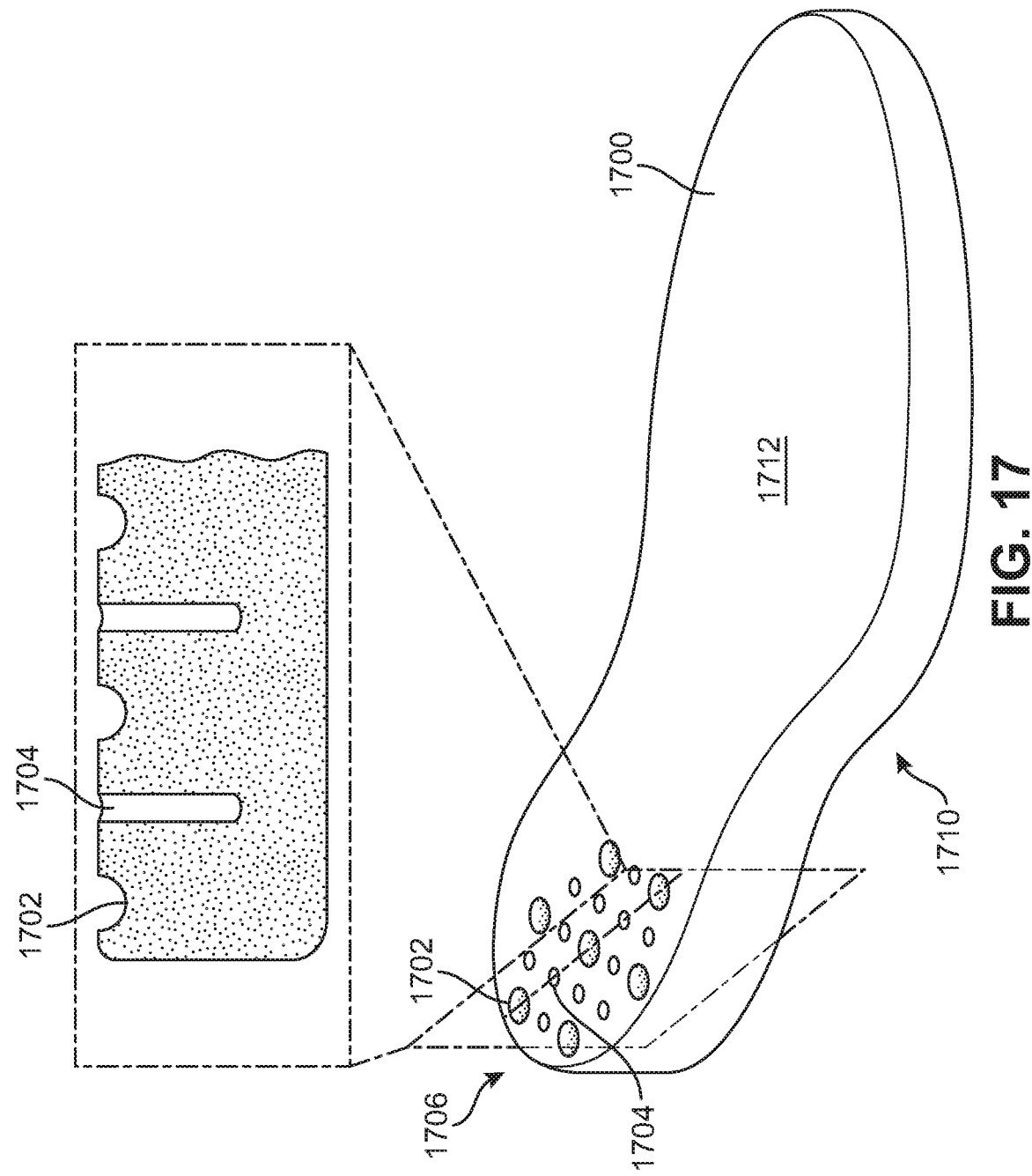
FIG. 17 shows an alternative embodiment of a modified midsole, including an isometric view and a zoomed in cross-sectional view.
Figure 20:
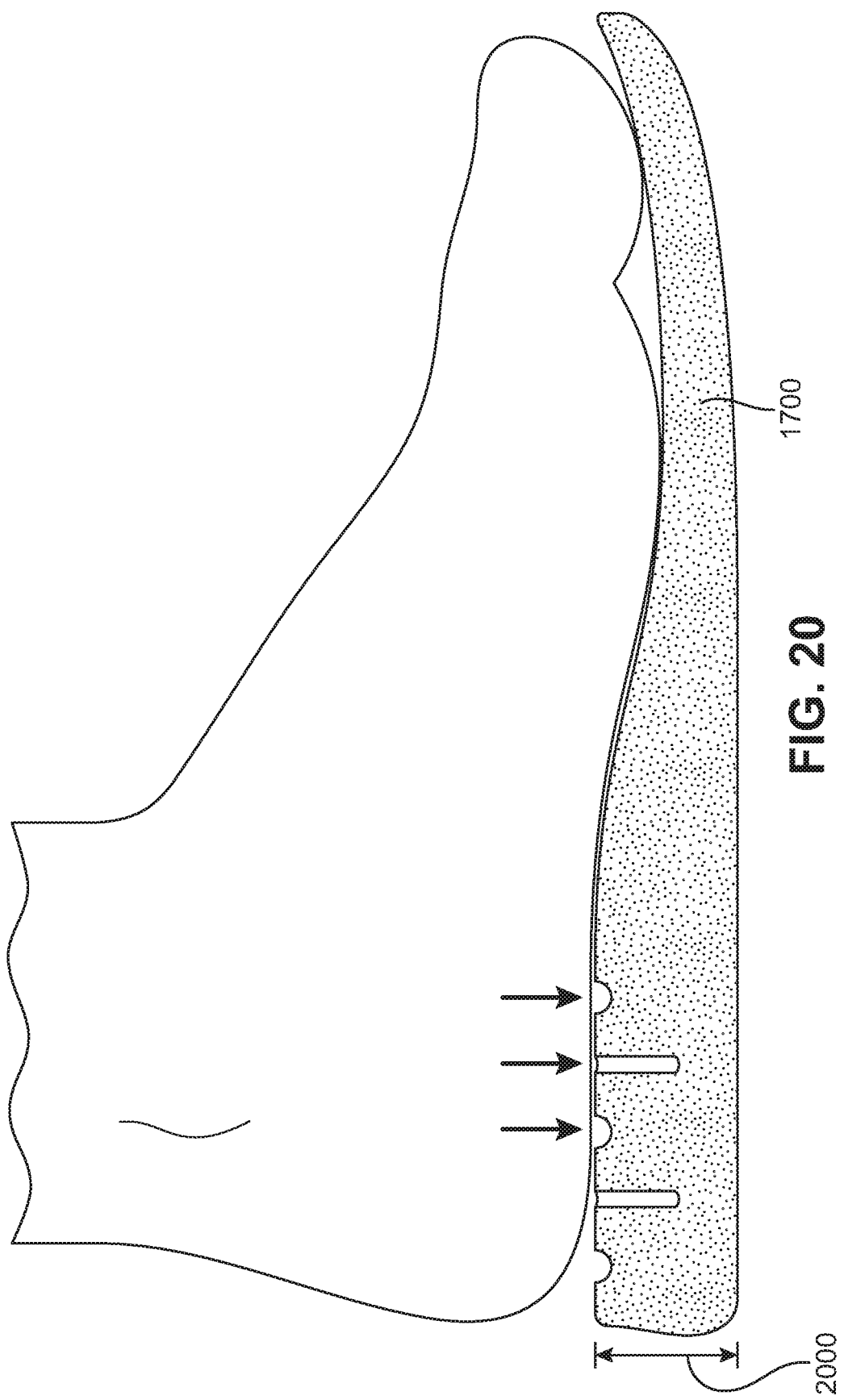
FIG. 20 shows the midsole shown in FIG. 17 responding to a force applied by a wearer's heel.

FIG. 17 shows a midsole 1700 according to another embodiment. FIG. 20 shows how midsole 1700 compresses in response to a force (indicated by arrows) applied by the wearer's medial side of his/her heel. Midsole 1700 may include apertures, including a first aperture type 1702 and a second aperture type 1704, disposed along an upper surface 1712 of a lateral side 1710 of a heel region 1706. FIG. 17 exemplifies how apertures may include a variety of shapes/sizes. For example, as shown in the zoomed in cross-sectional view of FIG. 17, first aperture type 1702 may be shallower than second aperture type 1704. Additionally, first aperture type 1702 may have a hemispherical shape, while second aperture type 1704 may have a cylindrical shape. Other embodiments may include other shapes/sizes of apertures. For example, in some embodiments, one or more apertures may have a conical shape.

Figure 18:
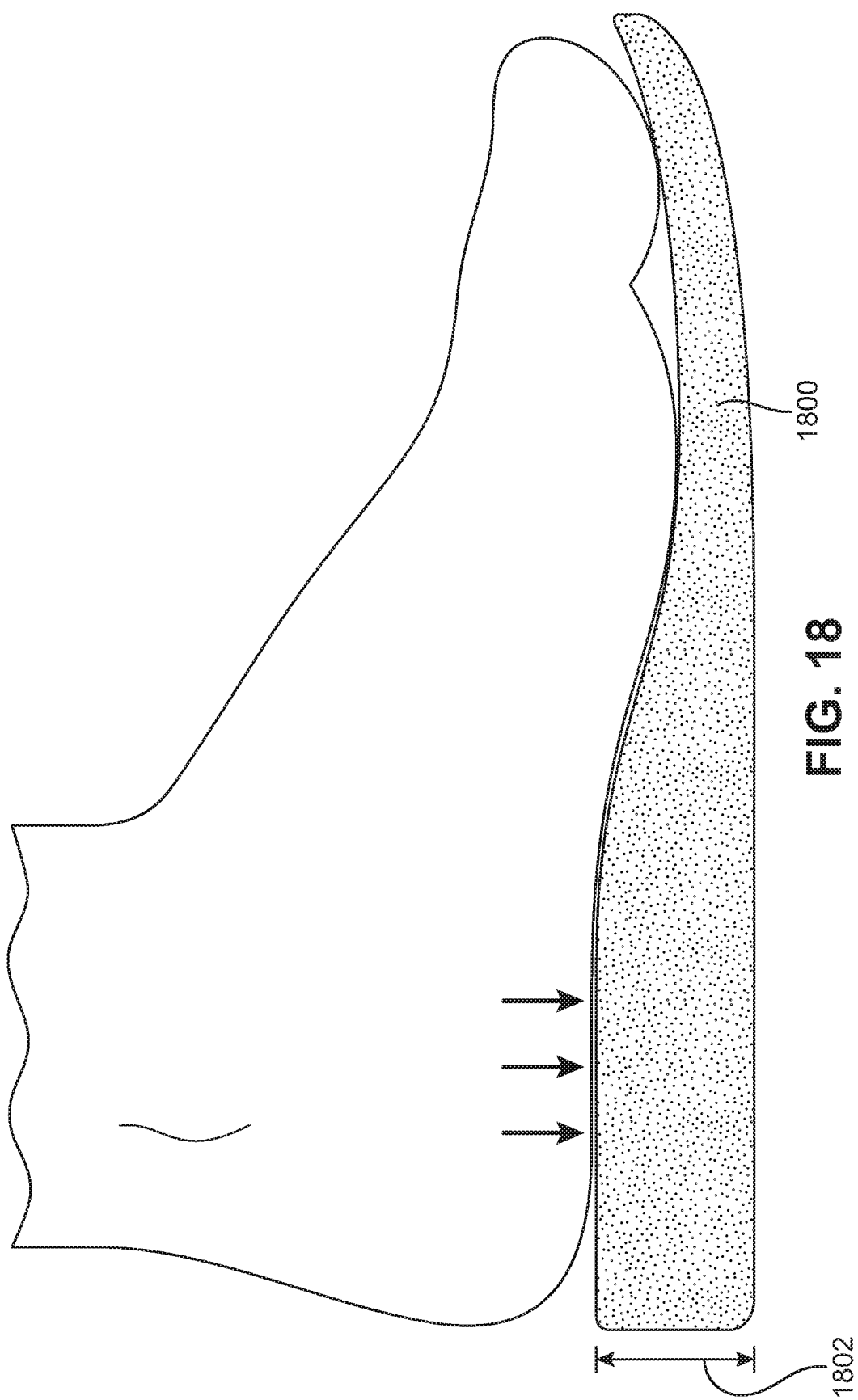
FIG. 18 shows a maximum firmness midsole responding to a force applied by a wearer's heel.
Figure 19:
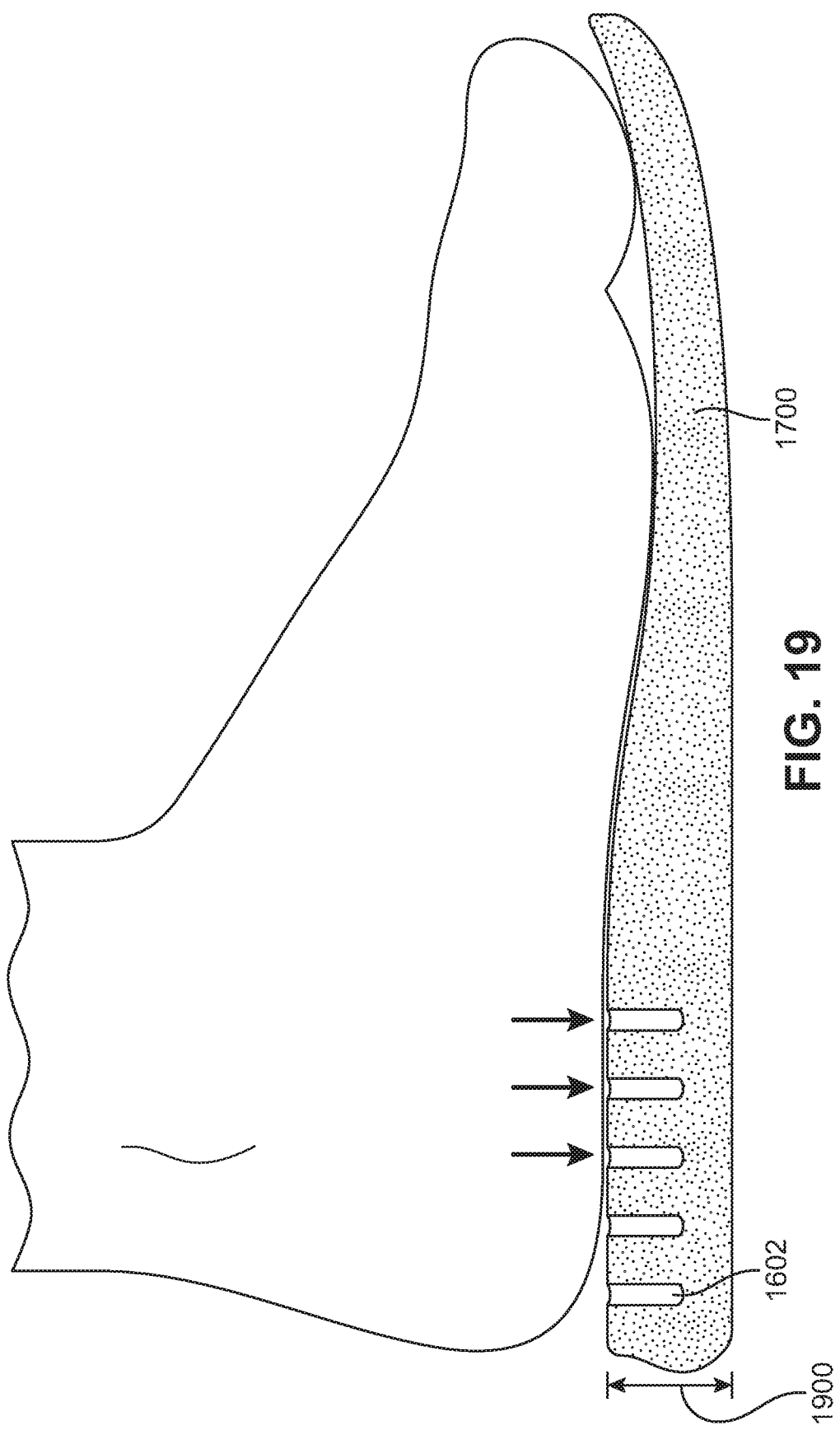
FIG. 19 shows the midsole shown in FIG. 16 responding to a force applied by a wearer's heel.

FIGS. 18-20 show a comparison of how midsoles having different compressibility may respond to a force applied by the wearer's medial side of his/her heel. FIG. 18 shows a midsole 1800 having maximum firmness responding to a force (indicated by arrows) applied by a wearer's medial side of his/her heel. Midsole 1800 may compress the least of the three exemplary midsoles shown in FIGS. 18-20. A thickness 1802 of midsole 1800, in comparison with a thickness 1900 of compressed midsole 1600, is thicker. In other words, midsole 1600 compresses more than midsole 1800 in response to the same wearer.

FIG. 19 shows how midsole 1600 may compress in response to a force (indicated by arrows) applied by the wearer's medial side of his/her heel. FIG. 19 shows midsole 1600, which may compress the most of the three midsoles. And FIG. 20 shows midsole 1700, which may compress less than midsole 1600 but more than midsole 1800. Such compression may be caused in midsole 1700 by the reduced number of longer, cylindrical apertures in comparison to midsole 1600. A thickness 1802 of midsole 1800, in comparison with a thickness 2000 of compressed midsole 1700, is thicker. A thickness 2000 of midsole 1700, in comparison with a thickness 1900 of compressed midsole 1600, is thicker.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of customizing an article of footwear, comprising:
   manufacturing a first article of footwear having a first sole structure with a forefoot region, a heel region opposite the forefoot region, and a midfoot region disposed between the forefoot region and the heel region, wherein the first article of footwear has a first heel stiffness profile;
   providing the first article of footwear to a customer as part of a pair of shoes;
   providing an evaluation system to the customer;
   receiving and storing a customer evaluation of heel stability of the first article of footwear via the evaluation system;
   receiving an order for a new pair of footwear from the customer;
   in response to receipt of the order, retrieving the customer evaluation of heel stability that was received and stored;
   in response to receipt of the order, manufacturing a second article of footwear having a second sole structure with a forefoot region, a heel region opposite the forefoot region, and a midfoot region disposed between the forefoot region and the heel region, wherein the step of manufacturing the second article of footwear includes adjusting at least one layer of the second sole structure of the second article of footwear to have a second heel stiffness profile that is different from the first heel stiffness profile, and wherein the second heel stiffness profile differs from the first heel stiffness profile based on the retrieved customer evaluation of heel stability; and
   providing the second article of footwear to the customer.

2. The method of claim 1, wherein the step of adjusting at least one layer of the second sole structure includes removing material from the second sole structure to form at least one aperture to provide the second heel stiffness profile.

3. The method of claim 2, wherein the step of removing material from the second sole structure includes drilling the at least one aperture into a surface of the second sole structure.

4. The method of claim 2, wherein the step of removing material from the second sole structure includes using a laser to drill the at least one aperture into a surface of the second sole structure.

5. The method of claim 2, wherein the step of removing material from the second sole structure includes using a rotary tool to drill the at least one aperture into a surface of the second sole structure.

6. The method of claim 2, wherein the at least one aperture is a blind hole.

7. The method of claim 1, wherein the step of providing the evaluation system includes providing the evaluation system to the customer on a mobile computer device, and wherein the customer evaluation is entered into the evaluation system through the mobile computer device.

8. The method of claim 1, wherein the at least one layer of the second sole structure that is adjusted in the adjusting step is a midsole layer made from a foam material.

9. A method of customizing an article of footwear, comprising:
   manufacturing a first article of footwear having a first sole structure with a forefoot region, a heel region opposite the forefoot region, and a midfoot region disposed between the forefoot region and the heel region, wherein the first article of footwear has a first heel stiffness profile;
   providing the first article of footwear to a customer;
   providing an evaluation system to the customer;
   receiving and storing a first customer evaluation of heel stability of the first article of footwear via the evaluation system;
   receiving an order for a new pair of footwear from the customer;
   in response to receipt of the order, retrieving the first customer evaluation of heel stability that was received and stored;
   in response to receipt of the order, manufacturing a second article of footwear having a second sole structure with a forefoot region, a heel region opposite the forefoot region, and a midfoot region disposed between the forefoot region and the heel region, wherein the step of manufacturing the second article of footwear includes adjusting the second sole structure of the second article of footwear to have a second heel stiffness that is different from the first heel stiffness profile, and wherein the second heel stiffness profile differs from the first heel stiffness profile based on the retrieved first customer evaluation; and providing the second article of footwear to the customer.

10. The method of claim 9, wherein the step of adjusting the second sole structure includes removing material from the second sole structure to create at least one aperture to provide the second heel stiffness profile.

11. The method of claim 9, wherein the evaluation system includes a rating of heel stability that is based on multiple options of ratings.

12. The method of claim 9, further comprising:
receiving a second customer evaluation of heel stability of the second article of footwear;
manufacturing a third article of footwear having a third sole structure with a forefoot region, a heel region opposite the forefoot region, and a midfoot region disposed between the forefoot region and the heel region;
using the first and second customer evaluations of heel stability to determine a third heel stiffness profile for the third sole structure, wherein the third heel stiffness profile is different from the first heel stiffness profile and the second heel stiffness profile;
adjusting the third sole structure of the third article of footwear to have the third heel stiffness profile; and
providing the third article of footwear to the customer.

13. The method of claim 10, wherein the step of removing material from the second sole structure includes removing material from a lateral side of the heel region of the second sole structure.

14. The method of claim 10, wherein the step of removing material from the second sole structure includes removing material from a lateral side of the heel region of the second sole structure to create at least one blind hole.

15. The method of claim 9, wherein the step of providing the evaluation system includes providing the evaluation system to the customer on a mobile computer device, and wherein the customer evaluation is entered into the evaluation system through the mobile computer device.

16. A method of customizing an article of footwear, comprising:
manufacturing a first article of footwear having a first sole structure with a forefoot region, a heel region opposite the forefoot region, and a midfoot region disposed between the forefoot region and the heel region, wherein the first article of footwear has a first heel stiffness profile;
providing the first article of footwear to a customer;
providing an evaluation system to the customer;
receiving and storing a customer evaluation of heel stability of the first article of footwear via the evaluation system;
receiving an order for a new pair of footwear from the customer;
in response to receipt of the order, retrieving the customer evaluation of heel stability that was received and stored;
in response to receipt of the order, manufacturing a second article of footwear having a second sole structure with a forefoot region, a heel region opposite the forefoot region, a midfoot region disposed between the forefoot region and the heel region, wherein the second sole structure has an outer surface with an upper surface, a lower surface, and a sidewall, wherein the step of manufacturing the second article of footwear includes removing material from the outer surface of the second sole structure of the second article of footwear to produce a second heel stiffness profile in the second article of footwear that is different from the first heel stiffness profile, and wherein the second heel stiffness profile differs from the first heel stiffness profile based on the retrieved customer evaluation; and
providing the second article of footwear to the customer.

17. The method of claim 16, wherein the step of removing material from the outer surface of the second sole structure includes removing material from a lateral side of the heel region of the second sole structure to create at least one aperture.

18. The method of claim 16, wherein the step of removing material from the outer surface of the second sole structure includes removing material from the sidewall of the second sole structure to create at least one aperture therein.

19. The method of claim 16, wherein the step of removing material from the outer surface of the second sole structure includes removing material from one of the upper surface and the lower surface of the second sole structure to create at least one aperture therein.

20. The method of claim 16, wherein the step of providing the evaluation system includes providing the evaluation system to the customer on a mobile computer device, and wherein the customer evaluation is entered into the evaluation system through the mobile computer device.

* * * * *